United States Patent
Teraoka

[19]

[11] Patent Number: 5,839,985
[45] Date of Patent: Nov. 24, 1998

[54] DIFFERENTIAL APPARATUS HAVING A THRUST WASHER

[75] Inventor: Masao Teraoka, Tochigi-ken, Japan

[73] Assignee: Tochigi Fuji Sangyo Kabushiki Kaisha, Japan

[21] Appl. No.: 291,778

[22] Filed: Aug. 17, 1994

[30] Foreign Application Priority Data

Aug. 18, 1993 [JP] Japan ..................................... 5-204263
Aug. 20, 1993 [JP] Japan ..................................... 5-206344

[51] Int. Cl.⁶ .................................................. F16H 48/26
[52] U.S. Cl. ............................ 475/90; 475/249; 475/252
[58] Field of Search .................................. 475/249, 250, 475/252, 84, 89, 90

[56] References Cited

U.S. PATENT DOCUMENTS

| | | | |
|---|---|---|---|
| 1,389,580 | 9/1921 | Davis ...................................... | 475/252 |
| 2,791,919 | 5/1957 | Wildhaber . | |
| 2,869,399 | 1/1959 | Miles . | |
| 3,251,244 | 5/1966 | Nickell . | |
| 5,122,101 | 6/1992 | Tseng ...................................... | 475/249 |
| 5,147,252 | 9/1992 | Mace et al. ............................. | 475/252 |
| 5,169,370 | 12/1992 | Dye et al. ............................... | 475/227 |
| 5,415,601 | 5/1995 | Cilano ..................................... | 475/252 |
| 5,458,547 | 10/1995 | Teraoka et al. .......................... | 475/89 |

FOREIGN PATENT DOCUMENTS

| | | |
|---|---|---|
| 39 31 745 C 1 | 3/1991 | Germany . |
| 40 13 196 A 1 | 10/1991 | Germany . |
| 40 27 368 A 1 | 3/1992 | Germany . |
| 1 256 990 | 12/1971 | United Kingdom ..................... 475/89 |
| 1256990 | 12/1971 | United Kingdom ..................... 475/89 |
| WO 85/04936 | 11/1985 | WIPO . |
| WO 86/02420 | 4/1986 | WIPO . |

Primary Examiner—Charles A. Marmor
Assistant Examiner—Sherry Lynn Estremsky
Attorney, Agent, or Firm—Graham & James LLP

[57] ABSTRACT

A differential apparatus comprises: a casing (1) rotated by an external power; a first shaft (9) rotatably supported by the casing: a second shaft (11) rotatably supported by the casing; a first side gear (17) formed integral with the first shaft: a second side gear (19) formed integral with the second shaft; and a helical pinion gear assembly (29. 31) geared between the first and second side gears within the casing filled with a viscous fluid. Therefore, a differential limiting force can be generated by gearing between the helical pinion gear assembly and tire first and second side gears, when the viscous fluid is pressurized and circulated within the casing by a gear pumping action of the helical pinion gear assembly caused by differential motion between the first and second side gears, even if the torque applied to one of the side gears is zero (as when one tire is floated perfectly from a road surface). The differential apparatus is provided with the differential limiting characteristics of both the torque sensitive type and the rotation difference type, in spite of a simple structure and a low cost.

15 Claims, 14 Drawing Sheets

DIFFERENTIAL APPARATUS HAVING A THRUST WASHER

BACKGROUND OF THE INVENTION

1. Field of the Invention

The present invention relates to a differential apparatus suitable for use with an automotive vehicle, for instance.

2. Description of the Prior Art

When a vehicle runs on a muddy road and thereby one of the vehicle wheels is being slipped, it is impossible to transmit a sufficient driving power to the other (non-slipping side) or the vehicle wheels. To overcome this problem, the differential apparatus used for automotive vehicles is usually provided with a differential limiting mechanism for limiting the differential motion thereof.

The above-mentioned differential limiting mechanism can be roughly classified into torque-proportional type (as disclosed in Japanese Published Unexamined (Kokai) Patent Application No. 64-87940) and rotation difference sensitive type (as disclosed in Japanese Published Unexamined (Kokai) Patent Application No. 2-197426).

FIG. 1A shows the above-mentioned differential apparatus having a torque-proportional type differential limiting mechanism. In the drawing, the differential apparatus is composed of a rotatable differential casing 131 driven by an engine power; first and second output shafts 133 and 135 both rotatably supported by the differential casing 131; first and second side rears 137 and 139 formed integral with the outer circumferences of the first and second output shafts 133 and 135, respectively so as to be rotatable within the differential casing 131; worm wheels 145 and 147 rvUtlubly supported by the differential casing 131 via shafts 141 and 143 and geared with the first and second side gears 137 and 139, respectively; and spur gears 149 and 151 geared with the worm wheels 145 and 147, respectively.

In the above-mentioned construction, when one vehicle wheel is slipped, an engine power can be transmitted to the non-slipping vehicle wheel on the basis of the friction and thrust, forces generated between the worm wheels 145 and 147 and the first and second side gears 137 and 139, respectively. In the above-mentioned torque-proportional type differential limiting mechanism, as shown in FIG. 2A, a differential limiting force can be generated in a region C enclosed by the two lines A and B (where TL denotes the left side vehicle wheel torque and TR denotes the right side vehicle wheel torque), so that it is possible to obtain an excellent steering stability.

In the torque sensitive type differential limiting mechanism as described above, however, in case one of the vehicle wheel is lifted off of the road surface, since almost no road surface resistance is applied to the floated wheel, no differential limiting force can be generated and therefore no torque can be generated as a reactive force thereof. As a result, all the engine power is transmitted to only the floated wheel, and no engine power is transmitted to the other wheel which is now in contact with the surface of a road. Therefore, it is impossible to drive the vehicle to get away from the non-driven condition where one of the wheel is kept floated from the road surface. In other words, in the above-mentioned torque-proportional type differential limiting mechanism is almost not effective when one of the wheel is kept floated away from a road surface.

On the other hand, FIG. 1D shows the afore-mentioned differential apparatus having a rotation difference sensitive type differential limiting mechanism. This differential apparatus is composed of two side gears 157 and 158; a cam surface 155 formed in an inner surface of a casing formed integral with the side gear 157; radially extending cam bodies 159 rotated together with the side gear 158 and movable radially inward and outward, due to the differential motion between the two side gears 157 and 158, in contact with the circumference of the cam surface 156; a plurality of hydraulic chambers 161 each of whose volumes is changed according to the radial reciprocating motion of the cam bodies 159; and an opening rate adjustable valve 165 interposed between an end of a hydraulic path 167 communicating with the respective hydraulic chambers 161 and an accumulator chamber 163.

In the above-mentioned differential apparatus, when a differential motion is generated between the two vehicle wheels and thereby the two side gears 157 and 158 are rotated relative to each other, since the cam bodies 159 kept in contact with the cam surface are moved reciprocatingly in the radial direction thereof by the relative rotation of the two side geared 157 and 158, the inner pressure within the hydraulic chamber 161 increases, so that the cam bodies 150 are urged against the cam surface 155 to generate a differential limiting force.

Further, as shown in FIG. 2B, in this differential limiting mechanism, roughly linear gain characteristics can be obtained from the low differential rotation range to the high differential rotation range according to the differential rotation ΔN between the two wheels. Therefore, even if one of the vehicle wheels is lifted off of a road surface, a differential limiting force can be generated due to a rotational difference between the right and left vehicle wheels and thereby a torque obtained as a reactive force thereof can be generated, with the result that it is possible to transmit an engine power securely to the other non-floating vehicle wheel.

In the case of the above-mentioned differential apparatus having the rotation difference sensitive type differential limiting mechanism, in a sportive vehicle driving as when the vehicle is turned under condition that an engine brake is being applied to the vehicle, since a differential motion can be generated due to a slight rotational difference between the right and left vehicle wheels and thereby an initial braking force is applied to the vehicle, there exists a problem in that the differential motion is not smooth. That is, in the sportive driving, the vehicle cannot be turned smoothly. As a result, this differential apparatus of the rotation difference sensitive type differential limiting mechanism is not suitable for the sportive vehicle driving.

To overcome above-mentioned problem, it may be possible to consider that the above-mentioned two different (toque-proportional and rotation difference sensitive) type differential limiting mechanisms can be combined with cach other.

In this case, however, since two different type differential limiting mechanism must be incorporated in the differential apparatus, the structure of the differential apparatus is inevitably complicated and thereby the cost thereof increases as a necessary consequence.

SUMMARY OF THE INVENTION

With these problems in mind, therefore, it is the object of the present invention to provide a differential apparatus provided with both the characteristics of the torque-proportional type and the rotation difference sensitive-type differential limiting mechanisms in spite of a simple structure and therefore a low manufacturing cost.

To achieve the above-mentioned object, the present invention provides a differential apparatus, comprising: a differential casing (1, 61, 201) rotated by an external power; a first shaft (9, 69, 209) rotatably supported by said differential casing on a first side thereof; a second shaft (11, 71, 211) rotatably supported by said differential casing on a second side thereof; a first side gear (17, 77, 217) formed integral with said first shaft and rotatable within said differential casing; a second side gear (15, 79, 219) formed integral with said second shaft and rotatable within said differential casing; and a helical pinion gear assembly (29, 31; 89, 91; 229, 231) geared between said first and second side gears within said differential casing filled with a viscous fluid, for generating a differential limiting force by gearing between said helical pinion gear assembly and said first and second side gears, when the viscous fluid is pressurized and circulated within said differential casing by a gear pumping action of said helical pinion gear assembly caused by differential motion between said first and second side gears.

Further, the helical pinion rear assembly comprises: at least one pair of first helical pinion gear (29, 89, 229) and second helical pinion gear (31, 91, 231) rotatably fitted to at least one pair of first pinion housing hole (21, 81, 221) and second pinion housing hole (23, 83, 223), respectively both formed in said differential casing.

Further, the first helical pinion gear (29, 299) is formed with a first gear portion (33, 233) in mesh with said first side gear (17, 217), a second gear portion (35, 235), and an intermediate opening portion (28, 228) formed between the first and second gear portions; and wherein said second helical pinion gear (31, 231) is formed with a third gear portion (37, 237) in mesh with the second gear portion (35, 235) of said first helical pinion gear (29, 229) and said second side gear (19, 219). Alternately, the first helical pinion gear (89) Is formed with a first gear portion (93) in mesh with said first side gear (77), a second gear portion (95), and an intermediate opening portion (128) formed between the first and second gear portions; and wherein said second helical pinion gear (91) is formed with a third gear portion (97) in mesh with the second gear portion (95) of said first helical pinion gear (89) and said second side gear (79), and a fourth gear portion (98) in mesh with the first gear portion (93) of said first helical pinion gear (89).

Further, it is preferable that he differential apparatus further comprises a thrust washer (259) formed with a plurality of U-shaped projections (259A) interposed between said first and second side gears (217, 219), each U-shaped projections (259A) being located at an inner end surface of the first gear portion (233) of said first pinion gear (229). Further, it is preferable that the differential apparatus comprises a split washer (247) fixed to a groove formed in the second helical pinion gear (231) at a boundary between the third gear portion (237) in mesh with the second side gear (219) and the same third gear portion (237) in mesh with the second gear portion (235) of said first helical pinion gear (229).

Further, the differential apparatus further comprises an accumulator (39, 99, 239) provided with a pressure relief valve formed within said casing to maintain pressure of the viscous fluid at roughly a constant pressure. Here, the accumulator (39, 99) having a pressure relief valve is provided between two inner end surfaces of said first and second side gears within said casing. Further, at least one accumulator (239) is formed between the two adjacent gears of said helical pinion gear assembly so as to communicate with openings of said helical pinion gear assembly via at least one communication portion (241).

Further, the differential apparatus further comprises fluid pressure adjusting means (231s, 233, 234) disposed in said accumulator (239) for adjusting a fluid charge rate to a volume of said differential casing. Here, the fluid pressure adjusting means comprises:; a piston (234) attached to an accumulator chamber (245) communicating with the accumulator; an adjust screw (231s) attached to the accumulator chamber; and a coil spring (233) elastically interposed between said piston and said adjust screw.

Further, the differential limiting force is generated between said two side gears by an increase in friction forces between outer surfaces of said helical pinion gear assembly and said differential casing, between engaged tooth surfaces of said helical pinion gear assembly, and between engaged tooth surfaces of said helical pinion gear assembly and said side gears, respectively.

On the other hand, the present invention provides a differential torque transmission apparatus, comprising: a differential, casing (309, 339): a first shaft (311) rotatably supported by said differential casing on a first side thereof: a second shaft (313) linked with said differential casing on a second side thereof; a sun gear (303) formed integral with said first shaft and rotatable within said differential casing; and a helical pinion gear assembly geared with said sun gear (303) and arranged in contact with said differential casing filled with a viscous fluid, for transmitting a torque between sun gear and said differential casing by gearing between said sun rear and said helical pinion gear assembly, when the viscous fluid is compressed within said differential casing by a gear pumping action of said helical pinion gear assembly caused by a differential motion between said first and second shafts.

Further, the helical pinion gear assembly comprises: at least one pair of first helical pinion gear (305, 349) and second helical pinion gear (307, 351)) rotatably fitted to at least one pair of first pinion housing hole (321, 353) and second pinion housing hole (323, 355), respectively both formed in said differential casing. The first helical pinion gear (305) is in mesh with said sun gear (303) at an end thereof and in mesh with said second helical pinion gear (307) at the remaining portion thereof. Alternately, the first helical pinion gear (349) is mesh with said sun gear (303) at d middle thereof and in, mesh with said second helical pinion gear (351) at both ends thereof.

Further, the torque is transmitted between said sun gear and said differential casing by an increase in friction force generated between outer surfaces of said helical pinion gear assembly and said differential casing, between engaged tooth surfaces of said helical pinion gear assembly, and between engaged tooth surfaces of said helical pinion gear assembly and said sun gears. respectively.

In the differential apparatus according to the present invention, when one of the vehicle wheel slips on a muddy road, since the load applied to the side gear linked with the slipping wheel drops, the helical pinion gear in mesh with this side gear is rotated in the rotational direction of the differential casing. In this case, however, since the rotational speed of the differential casing is slower than that of the helical pinion gears in mesh with this side gear. the helical pinion gears rotate under the conditions that tooth surfaces thereof are brought into pressure contact with each other and further the outer surfaces thereof are brought into pressure contact with the inner surface of the differential casing. Accordingly, a reaction force thereof is transmitted to the side gear linked with the other (non-slipping) of the vehicle wheel, so that torque can be transmitted to the other non-slipping vehicle wheel and thereby the vehicle can be driven out of the slipping condition.

On the other hand, when one of the vehicle wheel floats perfectly from the road surface, since the load applied to the side gear linked with the floated wheel becomes zero, no differential limiting force can be generated in the case of the prior art differential apparatus. Therefore, no reaction force is applied to the side gear linked with the non-floated vehicle wheel and consequently no torque is transmitted to the other non-floated vehicle wheel.

In the differential apparatus according to the present invention, however, since a viscous fluid is scaled within the differential casing, when a differential motion occurs between the two side gears, the viscous fluid is pressurized and circulated within the differential casing to the pumping action of the helical pinion gear assembly. As a result, the reaction force of the pressurized viscous fluid is applied to the pinion gear assembly, so that a differential limiting force can be generated as with the case where the vehicle is being slipped. That is, the helical pinion gears rotate under such conditions that tooth surfaces thereof are brought into pressure contact with each other and further the outer surfaces thereof are brought into pressure contact with the inner surface of the differential casing. Accordingly, an reaction force thereof is transmitted to the side gear linked with the other (non floating) of the vehicle wheel, so that it is possible to drive the vehicle.

Further, in the differential apparatus according to the present invention, the differential limiting characteristics of both the torque sensitive type and the rotation difference type can be obtained. Further, since only a viscous fluid is sealed within the differential casing to generate the differential limiting force by the helical gear pumping action, the differential apparatus according to the present invention is particularly simple in structure and low in manufacturing cost.

BRIEF DESCRIPTION OF THE DRAWINGS

FIGS. 12A and 12B are perspective views for assistance in explaining positive and negative fluid pressures generated by the helical gear pumping action, in which FIG. 12A shows the case when the vehicle is turned left and FIG. 12B shows the case when the vehicle is turned right;

DETAILED DESCRIPTION OF THE EMBODINIENTS

The embodiments of the differential apparatus according to the present invention will be described hereinbelow with reference to the attached drawings.

First Embodiment

A first embodiment or the present invention will be described with reference to FIGS. 3 to 6.

Figure 1A:
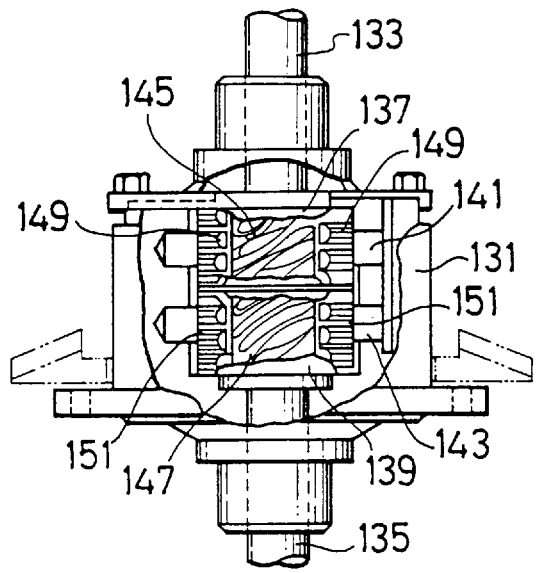
FIG. 1A is a side, partially broken view showing a part of a prior art differential apparatus of torque-proportional type differential mechanism.
Figure 1B:
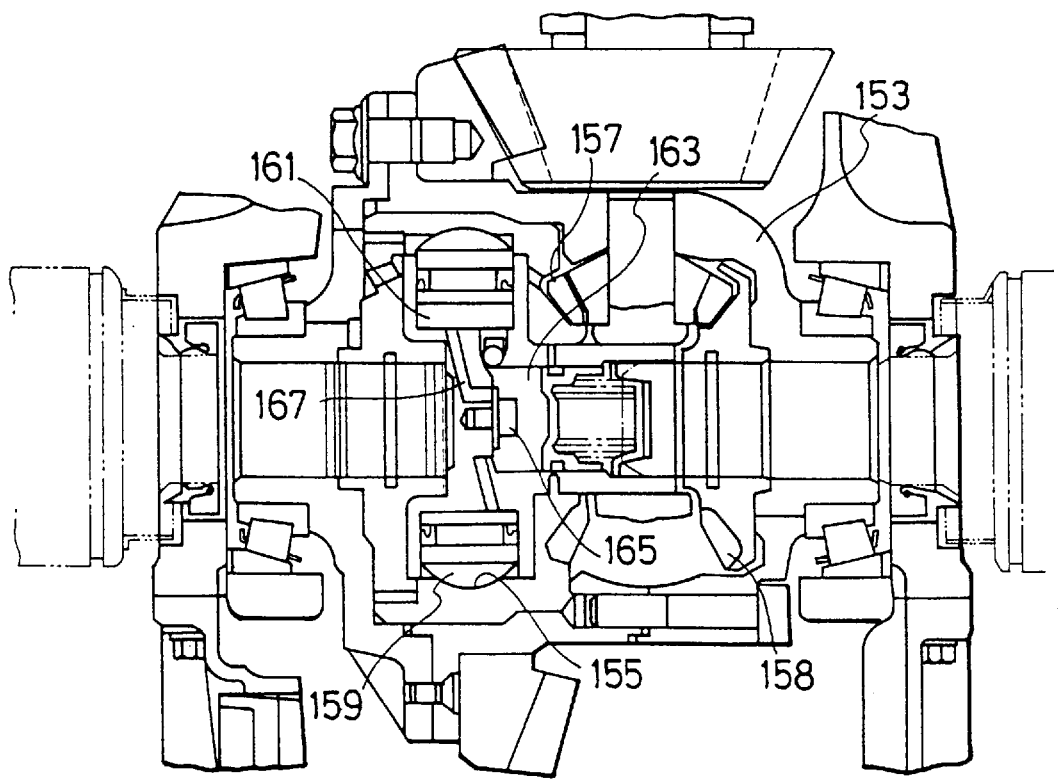
FIG. 1B is a front cross-sectional view showing a prior art differential apparatus of rotation difference sensitive type differential mechanism.
Figure 2A:
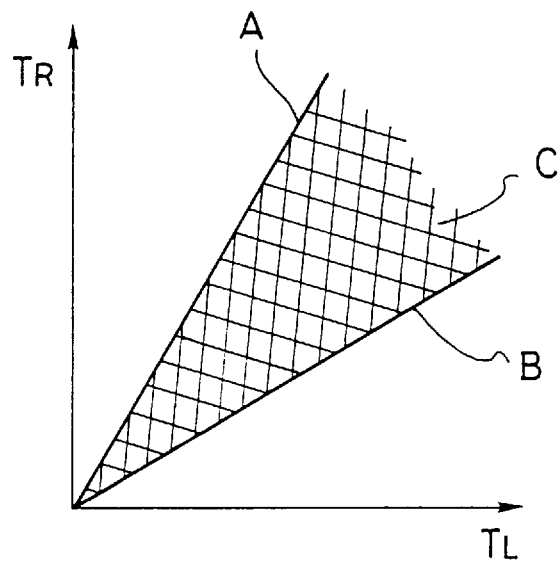
FIG. 2A is a graphical representation showing the differential limiting characteristics of the prior art torque-proportional type differential apparatus shown in FIG. 1A.
Figure 2B:
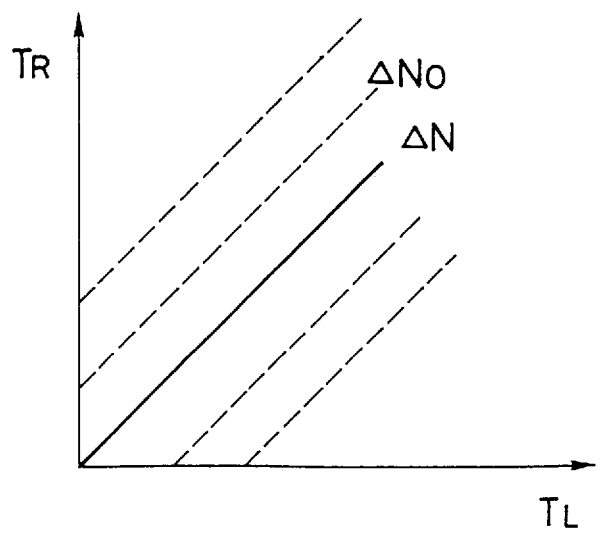
FIG. 2B is a graphical representation showing the differential limiting characteristics of the prior art rotation difference sensitive type differential apparatus shown in FIG. 1B.
Figure 3:
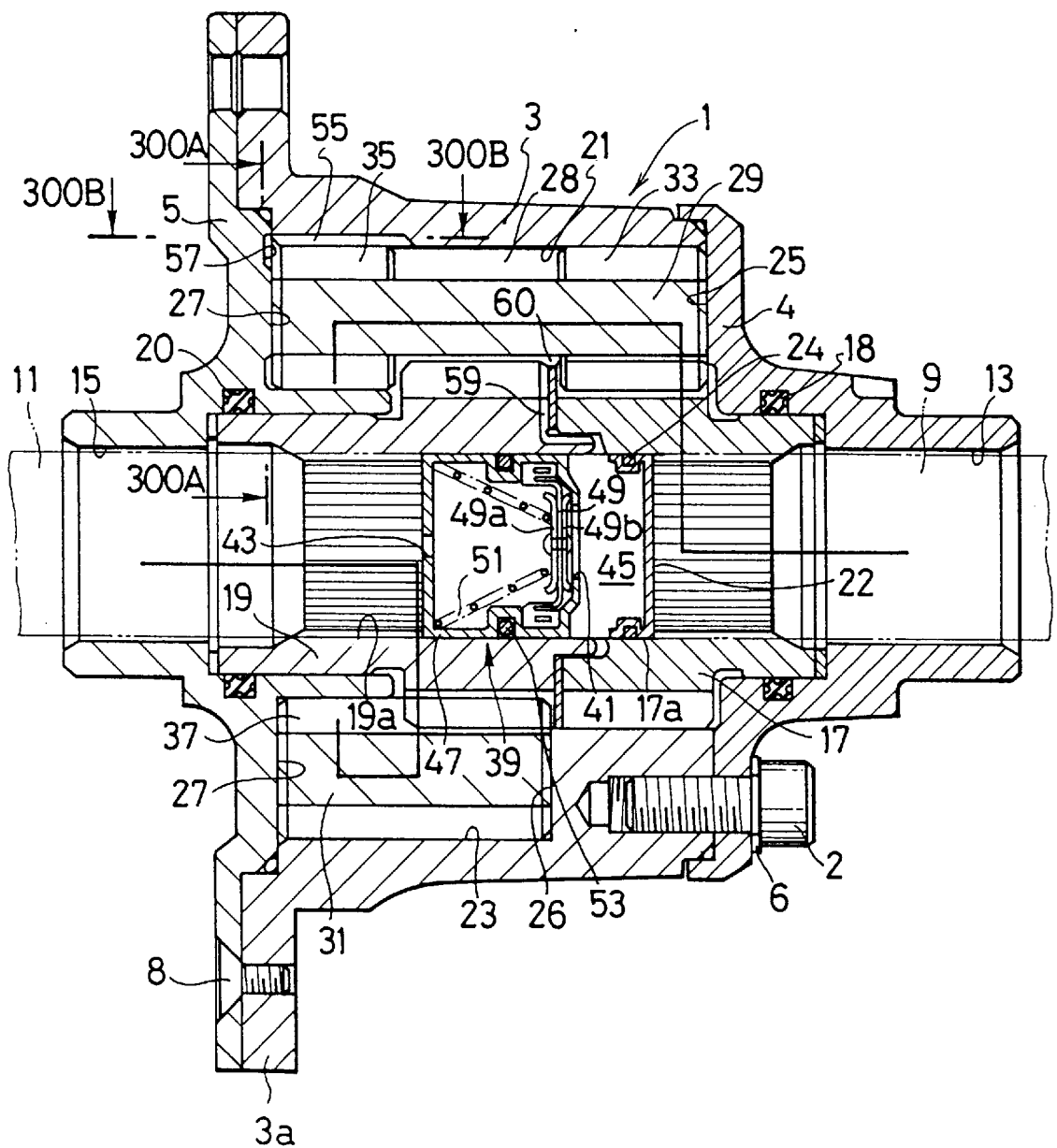
FIG. 3 is a front cross-sectional view showing a first embodiment or the differential apparatus according to the present invention.

In FIG. 3. a differential casing 1 is composed of a cylindrical casing body 3 opened on both side ends thereof and right and left covers 4 and 5. The right cover 4 is fixed to the casing body 3 with the use of bolts 2 and sealing washers 6, so that the right side opening of the casing body 3 can be airtightly closed. On the other hand, the left cover 5 is fixed to a flange portion 3a of the casing body 3 with flat headed screws 8, so that the left side opening of the casing body 3 can be also airtightly closed. As described above, the casing body 3 can be closed tightly by the covers 4 and 5 on both sides thereof. Within the differential casing 1, a viscous working fluid (e.g., silicone oil) is tightly sealed.

Within the casing body 3, a first shaft 9 and a secured shaft 11 are rotatably supported coaxially with the rotating axis of the casing 1. That is, the first shaft 9 is rotatably supported by a first axial hole 13 formed in the right cover 4, and the second shaft 11 is rotatably supported by a second axial hole 15 formed in the left cover 5.

Further, a first side gear 17 is spline coupled to an inner end circumference of the first shaft 9 inserted into the casing body 3, and similarly a second side gear 19 is spline coupled to an inner end circumference of the second shaft 11 inserted into the casing body 3. A washer 60 is interposed between the two side gears 17 and 19. A circumferential gap between the first side gear 17 and the right cover 4 is sealed by a sealing member 18, and a circumferential gap between the second side gear 19 and the left cover 5 is sealed by a sealing member 20. Further, a closing lid 22 is disposed at an end of the first shaft 9 within the casing body 3. A circumferential gap between this closing lid 22 and an inner wall of a shaft insertion hole 17a of the first side gear 17 is sealed by a sealing member 24.

Further, an accumulator 30 is formed between the two end surfaces of the first side gear 17 and the second, side gear 10. The accumulator 30 is composed of an accumulator body 47, a pressure lid 49 and a compressive conical coil spring 51. The accumulator body 47 is formed with a large-diameter opening 41 on the right side so as to face the closing lid 22, and a small-diameter opening 43 on the left side so as to face the second shaft 11. An accumulation chamber 46 is formed between the accumulator body 47 and the closing lid 22. The compressive conical coil spring 51 is disposed so as to urge the pressure lid 49 against the large-diameter opening 41 of the accumulator body 47 to close it. The circumferential gap between the accumulator body 47 and the inner wall of the shaft insertion hole 19a of the second side gear 19 is sealed by a sealing member 53. Further, the pressure lid 49 is formed with an alignment sealing member at the outer circumference thereof and further reinforced by two reinforcing members 49a and 49b on both sides thereof. Further, the compressive conical coil spring 51 is disposed between the reinforcing member 49a and the bottom of the accumulator body 47. The above-mentioned pressure lid 49 and the compressive conical spring 51 serve as a pressure relief valve within the accumulator 39 to relieve an excessive high pressure of the viscous fluid at high temperature, for instance.

Further, the casing body 3 is formed with two pairs of pinion housing holes 21 and 23 being arranged at angular intervals around and along the outer circumferences of the first; and second side gears 17 and 19.

Figure 4A:
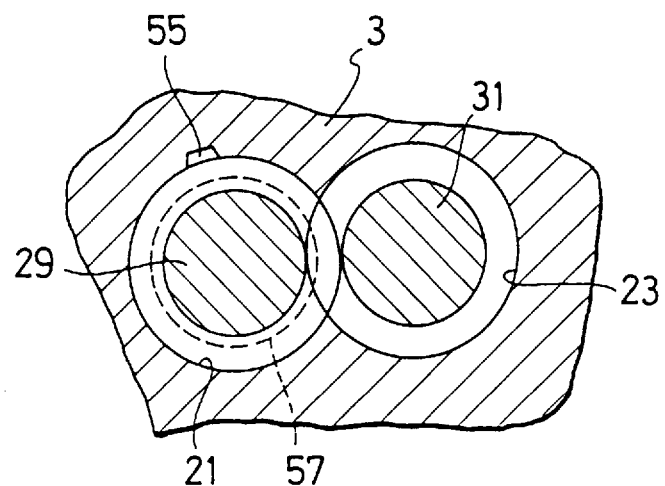
FIG. 4A is a cross-sectional view taken along the line 300A—300A shown in FIG. 3.

As shown in FIG. 4A. in the pinion housing hole 21, a first pinion gear 29 is housed under floating condition; and in the pinion housing hole 23, a second pinion gear 31 is housed under floating condition. The axial movements of these pinion gears 29 and 31 are restricted at both ends by annular or flat an annular stop surface 25 formed in a part of inner wall of the right cover 4, another annular stop surface 26 formed in the casing body 3, and by an annular stop surface 27 formed in an inner wall of the left cover 5, respectively.

The first pinion gear 20 is formed with a first gear portion 33 on the right side (the cover (4) side) thereof, and a second gear portion 35 on the left side (the cover (5) side) thereof. Therefore, an opening portion 28 (an oil chamber) is formed between the two gear portions 33 and 35 at the axially middle portion within the pinion housing hole 21. On the other hand, the second pinion gear 31 is formed with a single third gear portion 37.

Figure 5:
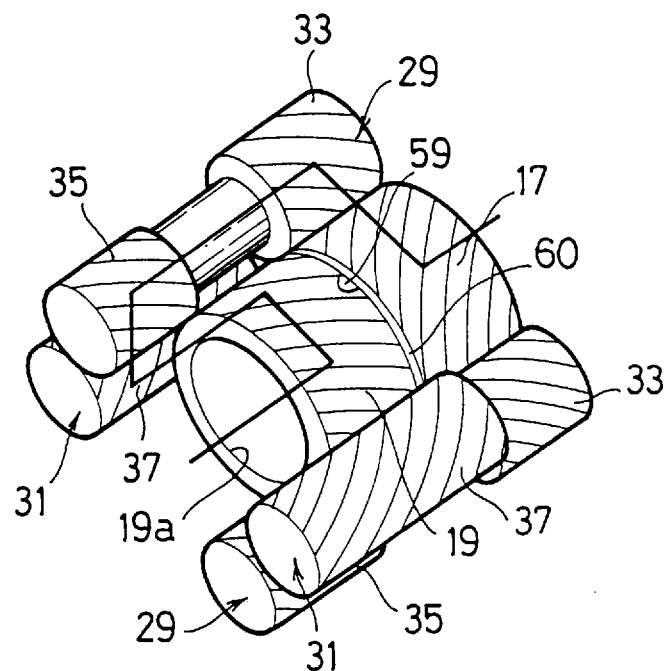
FIG. 5 is a perspective view showing the gearing status between side gears and a helical pinion gear assembly of the first embodiment of the differential apparatus shown in FIG. 3.
Figure 6:
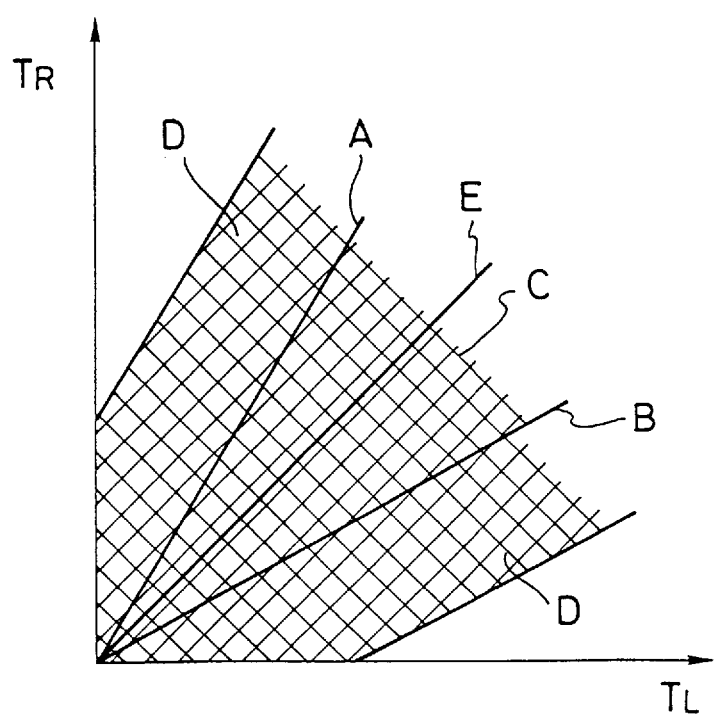
FIG. 6 is a graphical representation showing the differential limiting characteristics of the differential apparatus according to the present invention shown in FIG. 3.

As depicted in FIG. 5, the first side gear 17 is in mesh with the first gear portion 33 of the first pinion gear 20; the second gear portion 35 of the first pinion gear 20 is in mesh with the third gear portion 37 of the second pinion gear 31; and the third gear portion 37 is in mesh with the second side gear 19, respectively. Further, since being arranged along the circumference of the first and second side gears 17 and 19, two pairs of the first and second pinion gears 29 and 31 are to be supported by these first and second side gears 17 and 19, respectively in the radial direction thereof. The above-mentioned first and second side gears 17 and 19 and the first and second pinion gears 29 and 31 are all helical gears, as shown in FIG. 5, having the same module, the same torsional angle, and the same pressure angle with respect to each other. Therefore, the above-mentioned two pairs of the first and second pinion gears 29 and 31 constitute a pinion gear assembly, which is geared between the two side gears 17 and 19.

Further, a cutout portion 55 (see FIG. 3) communicating with the openings 28 (of the first pinion housing holes 21) is formed in an inner wall of the first pinion housing hole 21 of the casing body 3 on the side of the second gear portion 35. Further, on both radially inward and outward sides of the annular stop surface 27 of the left cover 5 in FIG. 3 an annular recessed portion 57 (see FIGS. 4A and 4B) communicating with the cutout portion 55 are formed. Further, a communication path 59 is formed at an inner end surface of the second side gear 19. The opening portion 28, the cutout portion 55, the annular recessed portion 57 and the communication path 59 constitute an oil passage connected to the accumulation chamber 45. Through these oil passages, oil pressurized by the pumping action of the helical pinion gear assembly can be circulated within the casing 1.

The casing 1 of the differential apparatus thus constructed is supported by bearings (not shown) on a vehicle body. Further, a ring gear (not shown) is attached to the outer circumference of the casing 1. An engine power is transmitted to this ring gear through an appropriate power transmitting apparatus (not shown). Further, the first and second shafts 9 and 11 are linked with right and left vehicle wheel shafts (both not shown), respectively.

The operation of the first embodiment of the differential apparatus according to the present invention will be described hereinbelow.

When the vehicle is traveling straight, since no rotational difference is produced between the right and left wheels, no relative rotational difference exists between the first side gear 17 and the second side gear 19, that is, between the first pinion gear 29 and the second pinion gear 31. In other words, since the casing 1 is driven by an engine power via the power transmission apparatus, the first pinion gear 29 and the second pinion gear 31 rotate together with the casing 1 without rotating around their own rotational axes. Accordingly, the first side gear 17 in mash with the first pinion gear 29 and the second side gear 19 in mesh with the second pinion gear 31 both rotate together with the casing 1, with the result that the first and second shafts 9 and 11 rotate together with the casing 1 at the same rotational speed.

When the vehicle is turned, since a rotational difference is produced between the right and left wheel shafts, the first side gear 17 and the second side gear 19 rotate at two rotational speeds different from each other. For instance, when the first side gear 17 rotates faster than the differential casing 1, the first pinion gear 29 in mesh with the first side gear 17 rotates around its own axis and thus the second pinion gear 31 in mesh with the first pinion gear 29 rotates also around its own axis. Therefore, the second side gear 19 in mesh with the second pinion gear 31 rotates relative to the casing 1. In other words, since the first side gear 17 rotates faster than the second side gear 19; that is, since the right wheel shaft rotates faster than the left wheel shaft, the vehicle can turn smoothly.

Further, when one wheel slips on a road whose friction coefficient is small between the tire and the road surface, as when the vehicle travels on a muddy road, sand road, icy road, etc., in the same way as with the case of the vehicle turning, the first and second pinion gears 29 and 31, that is, the first side gear 17 and the second side gear 19 rotate differentially. For instance, when the friction coefficient between the first side gear (17) side tire and the road surface is smaller than that between the second side gear (19) side tire and the read surface, since the first side gear 17 rotates faster than the casing 1. the first pinion gear 29 in mesh with the first side gear 17 rotates.

Under these conditions, since helical gear reaction forces arc generated at the respective helical gears due to a resistance generated between the slipping side tire and the road, frictional forces can be generated between the engaging helical teeth of the first pinion gear 29. the second pinion gear 31 and the two side gears 17 and 19 and between the outer surfaces of the first and second pinion gears 29 and 31 and the inner surfaces of the first and second pinion housing holes 21 and 23, respectively. In other words, pinion gears of the helical gear assembly are rotated under the conditions that the tooth surfaces thereof are kept in pressure contact with each other and in addition the outer surfaces of the helical gear assembly are also kept in pressure contact with the inner surfaces of the casing 1 due to the reaction forces generated at the respective helical gears (caused by the resistance between the slipping tire and the road surface).

Consequently, the rotation of the first side gear 17 is limited, and the second side gear 19 rotates on the basis of the reactive force of the first side gear 17. In other words, a rotational force larger by a generated reaction force than that of the slipping tire can be transmitted to the non-slipping tire. Owing to the driving force transmitted to the non-slipping tire, the vehicle can be driven to get away from the status where the one wheel is slipping.

Further, when one wheel is lifted off the road surface, since the road resistance of the floating-side wheel is zero, in the same way as with the case of the vehicle turning, the first and second pinion gears 29 and 31 for a differential. Simply under such a condition, since no resistance is generated between the floating tire and the road surface, no reaction force would have been generated at the respective helical gears, that is, between the first pinion gear 29 and the first pinion housing hole 21, between the second pinion gear 31 and the second pinion housing hole 23, and between the engaged tooth surfaces of the two pinion gears 29 and 31. That is, since the two pinion gears 29 and 31 rotate freely without generating large friction forces thereat, the engine power might have been transmitted mainly to the vehicle wheel of a smaller road surface resistance, that is, to the wheel floated from the road perfectly.

In this first embodiment of the differential apparatus, however, the viscous fluid (oil) sealed within the differential casing 1 is pressurized and circulated due to the pumping action of the helical gear assembly. For instance, with reference to FIG. 4B, since the oil is pressurized by the gearing motion between the second gear portion 35 and the third gear portion 37, the oil flows under pressurized condition in the allow (AA) directions shown in FIG. 4B. Therefore, the pressure within the pinion housing holes 21 and 23 rises and further the pressurized oil collides against the inner walls of the two pinion housing holes 21 and 23, so that the two pinion gears 29 and 31 are urged away from the inner walls thereof (downward in FIG. 3B). Under these conditions, the first and second pinion rears 29 and 31 rotate under such conditions that the tooth surfaces thereof are brought into pressure contact with each other and in addition the outer surfaces of the two pinion gears 29 and 31 are brought into pressure contact with the inner surfaces of the pinion housing holes 21 and 23, respectively due to the reaction forces generated at the respective helical gears.

Therefore, a differential limiting force can be generated at the helical gear assembly. The generated differential limiting force is applied to the first and second side teases 17 and 19. As a result, since a torque can be generated at one of the side gears as the reactive force of this differential limiting force, it is possible to transmit an engine power to the non-floating vehicle wheel.

Figure 4B:
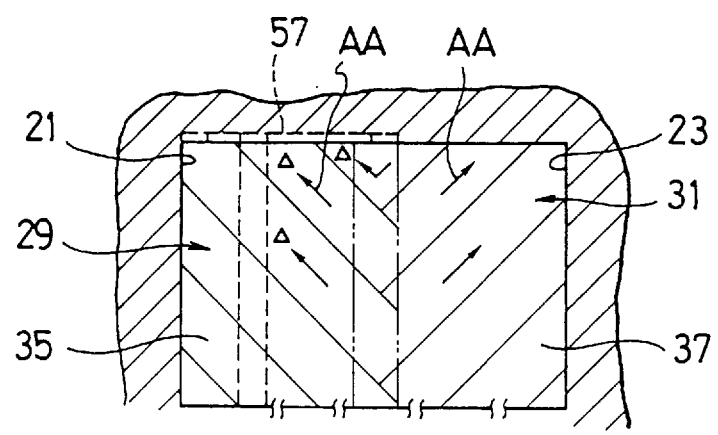
FIG. 4B is a cross-sectional view taken along the line 300B—300B shown in FIG. 3.

Further, in FIG. 4B, the arrows AA with a mark Δ indicate the oil flow obtained when the pumping function generated by the helical gear assembly is small. In this case, the oil flows into the circular cutout portion 57 formed in the left cover 5. This is because the oil pressure is not high enough to move the second pinion gear 31 away from the inner wall of the second pinion housing 23.

The above-mentioned effect will be described in further detail with reference to FIG. C. In the case of the prior art torque-proportional type differential apparatus such that the limiting force is generated on the basis of only the reaction forces generated at the engaged tooth surfaces (of the first and second pinion gears 29 and 31 and the first and second side gears 17 and 19) and at the outer gear surfaces (between the outer surfaces of the helical gears and the inner walls of the differential casing 1), the differential limiting force can be generated only within a range C enclosed between two straight lines A and B. However, as already explained, when one of the vehicle wheels is floated perfectly from the road surface, since the right side torque TR or the left side torque TL is almost zero, the differential motion is generated roughly along the straight line E, with the result that it is impossible to generate a differential limiting force. Accordingly, in the case of the prior art torque-proportional type differential apparatus having provided with no working fluid within the casing, it is impossible to transmit an engine power to the vehicle wheel floated perfectly from the road.

In the differential apparatus according to the present invention, however, since the viscous fluid is pressurized by the above-mentioned pumping action of the helical gear assembly, when the differential rotation occurs between the first and second side gears 17 and 19 relative to the differential casing 1. it is possible to generate a limiting force between the first and second pinion gears 29 and 31, so that the engine power can be transmitted to the vehicle wheel floated perfectly from the road surface. In summary, in FIG. 6. it is possible to generate the differential limiting force within a wide range D in addition to the range C.

In this first embodiment, in the case where the oil pressure is appropriately determined to be low enough not to generate an initial braking force but to be high enough to increase the oil pressure due to the pumping action of the helical gear assembly, even if the vehicle is driven in sportive driving such as when the vehicle is turned by applying engine brake to the vehicle, it is possible to generate a smooth differential motion and thereby to turn the vehicle smoothly during the sportive driving.

Further, in the differential apparatus of the present embodiment, since the differential limiting force can be obtained by sealing oil within the differential casing 1 and the sealed oil can be circulated by the helical gear pumping action between the first and second pinion gears 29 and 31 and the first and second side gears 17 and 19, respectively, the apparatus is simple in structure and low in cost, in spite of the fact that the differential apparatus is provided with the differential limiting force of both the torque-sensitive and rotation difference sensitive type characteristics.

Further, in this embodiment, since the accumulator 39 provided with a pressure relief valve. It is possible to maintain the viscous fluid pressure at a constant value, while preventing an excessive pressure rise within the differential casing 1 at a high temperature, for instance.

Second embodiment

Figure 7:
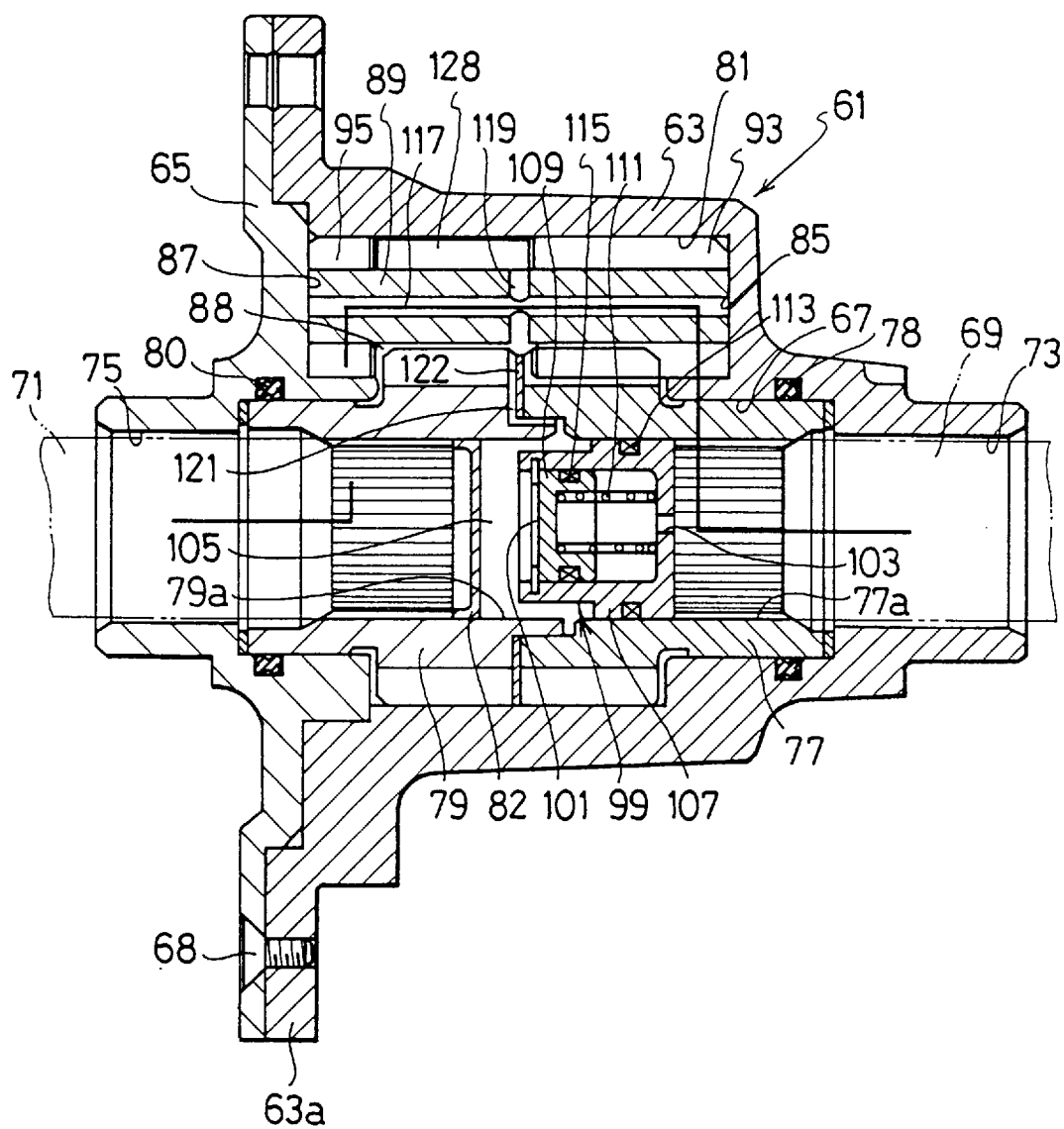
FIG. 7 is a front cross-sectional view showing a second embodiment of the differential apparatus according to the present invention.

A second embodiment or the present invention will be described hereinbelow with reference to FIGS. 7 and 8. In this second embodiment, the differential casing, the accumulator, and the helical gear assembly are slightly different in structure from those of the first embodiment.

In more detail, a differential casing 61 of the apparatus is composed or a casing body 63 and a cover 65, and rotated by a driving power applied transmitted from an engine (not shown). The cover 65 is fixed to a flange portion 63a of the casing body 63 with flat headed screws 68 to airtightly close all opening portion of the casing body 63. In the same way as with the case of the first embodiment, a viscous fluid such as silicone oil is sealed within the differential casing 61.

In a housing chamber 87 of the casing body 63, a first shaft 69 and a second shaft 71 are rotatably inserted coaxially with the rotating axis or file differential casing 61. The first shaft 69 is supported by a first axial hole 73 formed in the casing body 63, and the second shaft 71 is supported by a second axial hole 75 formed in the cover 65, respectively.

Further, a first side gear 77 is spline coupled to an inner end circumference of the first shaft 69 inserted into the casing body 63, and similarly a second side gear 79 is spline coupled to an inner end circumference of the second shaft 71 inserted into the casing body 63. A washer 122 is interposed between two inner end surfaces of the two side gears 77 and 79. A circumferential gap between the first side gear 77 and the casing body 63 is sealed by a sealing member 78, and a circumferential gap between the second side gear 79 and the cover 85 is sealed by a sealing member 80. Further, a closing lid 82 is disposed at an end of the second shaft 71 within the casing body 63. This closing lid 82 closes a gap between the shaft insertion hole 79a (to which the second side gear 79 is spline coupled) and the second side gear 79.

Further, an accumulator 99 is formed between the two side gears 77 and 79. The accumulator 99 is composed of an accumulator body 107, a pressure lid 109 and a compressive coil spring 111. The accumulator body 107 is formed with a large-diameter opening 101 closed by the pressure lid 109, and a small-diameter opening 103 on the right side thereof. The compressive coil spring 111 is disposed so as to urge the pressure lid 109 against the opening 101 to close it. Therefore, an accumulator chamber 105 is formed between the closing lid 82 and the accumulator body 107. The circumferential gap between the accumulator body 107 and the inner wall of the shaft insertion hole 77a of the first side gear 77 is sealed by a sealing member 113. Further, a gap between the pressure lid 109 and the accumulation body 107 is sealed by a sealing member 115.

Further, the casing body 83 is formed with two pairs of pinion housing holes 81 and 83 arranged at regular intervals around and along the outer circumferences of the first and second side gears 77 and 79. Both the axially outer ends of these pinion housing holes 61 and 83 are closed by the cover 95. Further, an opening portion 88 is formed at the axially left side of the pinion housing holes 81 and 83.

In the pinion housing hole 61, a first pinion gear 89 Is housed under floating condition; and in the pinion housing hole 83, a second pinion gear 91 is housed under floating condition. The axial movements of these pinion gears 89 and 91 are restricted by an annular stop surface 85 formed in a right side inner surface of the casing body 63 and an annular stop surface 87 formed in a left side inner surface of the cover 65.

The helical pinion gear assembly is coupled of a first pinion gear 89 formed with a first gear portion 93 on the right side (the casing body (63) side) thereof, and a second gear portion 95 on the left side (the cover (65) side) thereof. Therefore, an opening portion 128 is formed between the two gear portion 93 and 95 at the axially middle portion within the pinion housing hole 81. In the same way, the second pinion gear 91 is formed with a third gear portion 97 on the left side thereof and a fourth gear portion 98 on the right side thereof. Therefore, an opening portion is formed between the two gear portions 07 and 08.

Figure 8:
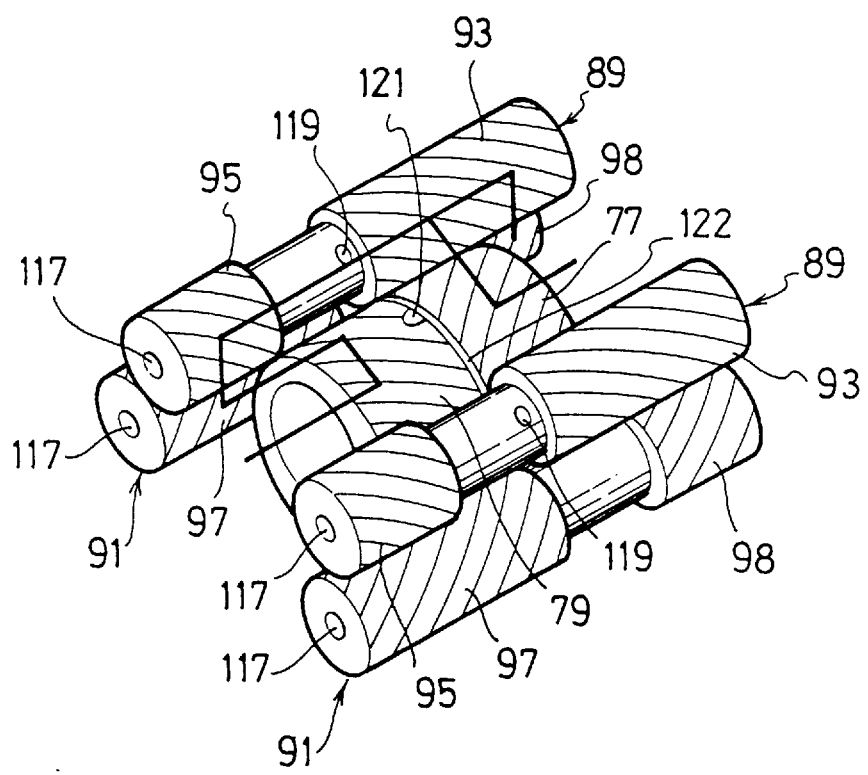
FIG. 8 is a perspective view showing the gearing status between side gears and a helical pinion gear assembly of the second embodiment of the differential apparatus shown in FIG. 7.

As shown in FIG. 8. the first side sear 77 is in mesh with the first gear portion 93 of the first pinion gear 89; the second gear portion 95 of the first pinion gear 89 is in mesh with the third gear portion 97 of the second pinion gear 91; the third gear portion 97 of the second pinion gear 91 is in mesh with the second side gear 79; and the fourth gear portion 98 of the second pinion gear 91 is in mesh with the first gear portion 93 of the first pinion gear 89, respectively. Further, since being arranged on the circumference of the first and second side gears 77 and 79, two pairs or the first and second pinion gears 89 and 91 are supported by these first and second side gears 77 and 79, respectively, in the radial direction thereof.

Further, the pinion shafts of the first and second pinion gears 89 and 91 are formed with an axial return path 117 (see FIG. 8) passing through a central axis thereof, respectively and further with another radial return path 119 (see FIG. 8) perpendicular to the axial return path 117, respectively. Further, a communication path 121 (see FIG. 7) communicating between the opening portion 88 and the accumulator chamber 105 is formed between the first side gear 77 and the second side gear 79. Therefore, the opening portion 128, the radial return paths 119, the axial return path 117, and the communication path 121 constitute an oil passage connected to the accumulation chamber 105.

Through these oil passages, oil pressurized by the pumping action of the helical gear assembly can be circulated within the casing 61.

The differential casing 61 of the differential apparatus thus constructed is supported by bearings (not shown) on a vehicle body. Further, a ring gear (not shown) is attached to the outer circumference of the casing 61. An engine power is transmitted to this ring gear through an appropriate power transmitting apparatus (not shown). Further, the first and second shafts 69 and 71 are linked with right and left vehicle wheel shafts (both not shown), respectively.

The operation of the second embodiment of the differential apparatus according to the present invention will be described hereinbelow.

When the vehicle is traveling straight, since the first pinion gear 89 and the second pinion gear 91 rotate together with the casing 61, an engine power is distributed equally to the first and second side gears 77 and 79, without producing any differential motion between the two side gears 77 and 79.

When the vehicle is turned, since a rotational difference is produced between the right and left wheel shafts, a differential motion is produced between the first side gear 77 and the second side gear 79, so that one of the vehicle wheels can rotate faster than the other of the vehicle wheels and thereby the vehicle can turn smoothly.

Further, when one wheel slips on a road whose friction coefficient is small between the tire and the road surface, as when the vehicle travels on a muddy road, sand road, icy road, etc., in the same way as with the case of the vehicle turning, the first side gear 77 and the second side gear 79 rotate differentially. In this case, since a reaction force of helical gearing can be generated at the respective helical gears due to a resistance between the slipping tire and the road surface, the first pinion gear 89 and the second pinion gear 91 rotate under the conditions that the tooth surfaces thereof are kept in pressure contact with each other and in addition that the outer surfaces of the helical gear assembly are also kept in pressure contact with the inner surfaces of the casing 61 due to the reaction force generated at the respective helical gears (caused by the resistance between the slipping tire and the road surface).

Consequently, the rotation of one (e.g., 77) of the two side gears 77 and 79 is limited, and the other (e.g., 79) of the two rotate of the basis of the reactive force of the limited side gear (e.g., 77). In other words, a rotational force larger by the generated reactive force than that of the slipping tire can be transmitted to the non-slipping tire. Owing to the driving force transmitted to the non-slipping tire, the vehicle can be driven again to get away from the status where the one wheel is being slipping.

Further, when one wheel is floated perfectly from the road surface, since the road resistance of the floating-side wheel is zero, in the same way as with the case of the vehicle turning, the first and second pinion gears 89 and 91 rotate differentially. Under these conditions, in the case of the prior art differential apparatus, no resistance is generated between the floating tire and the road surface and therefore no reaction force is generated at the respective helical gears, that is, between the first pinion gear 89 and the first pinion housing hole 81, between the second pinion gear 91 and the second pinion housing hole 83, and between the engaged tooth surfaces of the two pinion gears 89 and 91. That is, since the two pinion gears 89 and 91 rotate freely without generating any friction forces thereat, the engine power is to be mainly transmitted to the vehicle wheel of less road surface resistance, that is, to the wheel floated from the road perfectly.

In this second embodiment of the differential apparatus, however, since the viscous fluid (oil) sealed within the differential casing 61 is pressurized and circulated due to the pumping action of the helical gear assembly, the oil pressure within the pinion housing holes 81 and 83 rises and the pressurized oil urges the two pinion gears 89 and 91 against the inner wall surfaces of the pinion holes 81 and 83. Under these conditions, the first and second pinion gears 89 and 91 rotate under such conditions that the tooth surfaces thereof are brought into pressure contact with each other and in addition the outer surfaces of the two pinion gears 89 and 91 are brought into pressure contact with the inner surfaces of the pinion housing holes 81 and 83, respectively due to the reactive forces generated at the respective helical gears. Therefore, a differential limiting force can he generated at the helical gear assembly. The generated differential limiting force is applied to the first and second side gears 77 and 79. As a result, since a torque can be generated at one of the side gears as the reactive force of this differential limiting force, it is possible to transmit an engine power to the non-floating vehicle wheel.

Further, in the differential apparatus of the present embodiment, since the differential limiting force can be obtained by viscous oil within the differential casing 61 and the viscous oil is circulated by the helical gear pumping action between the first and second pinion gears 89 and 91. the apparatus is simple in structure and low in cost, while having the characteristics of both the torque-sensitive type and the rotational difference sensitive type.

Further, in the second embodiment, since the accumulator 99 with a pressure relief valve is provided, it is possible to maintain the viscous fluid pressure at a constant value, while preventing an excessive pressure rise within the differential casing 61, for instance at high temperature.

Third embodiment

A third embodiment of the differential apparatus according to the present invention will be described hereinbelow with reference to FIGS. 9 to 12B.

This third embodiment differs from the first and second embodiments In that: (1) the accumulator is formed away from the middle portion of the casing (between the two side gears); (2) the second pinion gear is divided into two gear portions with a split washer; (3) a thrust washer having U-shaped projections is interposed between the first and second side gears; and (4) a differential limiting force adjusting mechanism is further provided. These are additionally provided to utilize the helical gear pumping action more effectively and finely.

Figure 9:
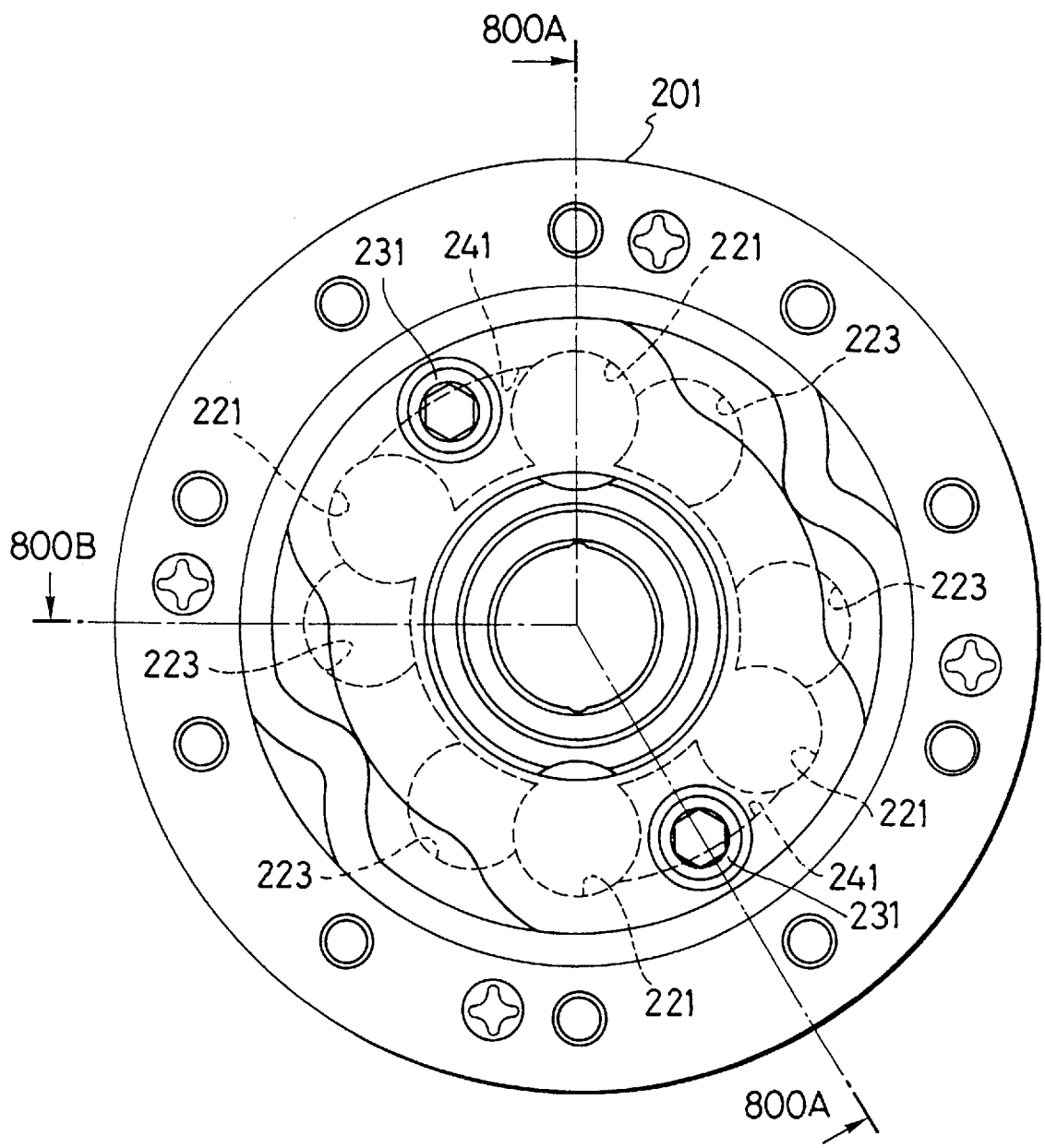
FIG. 9 is a front side view showing the differential casing of a third embodiment of the differential apparatus according to the present invention.
Figure 10A:
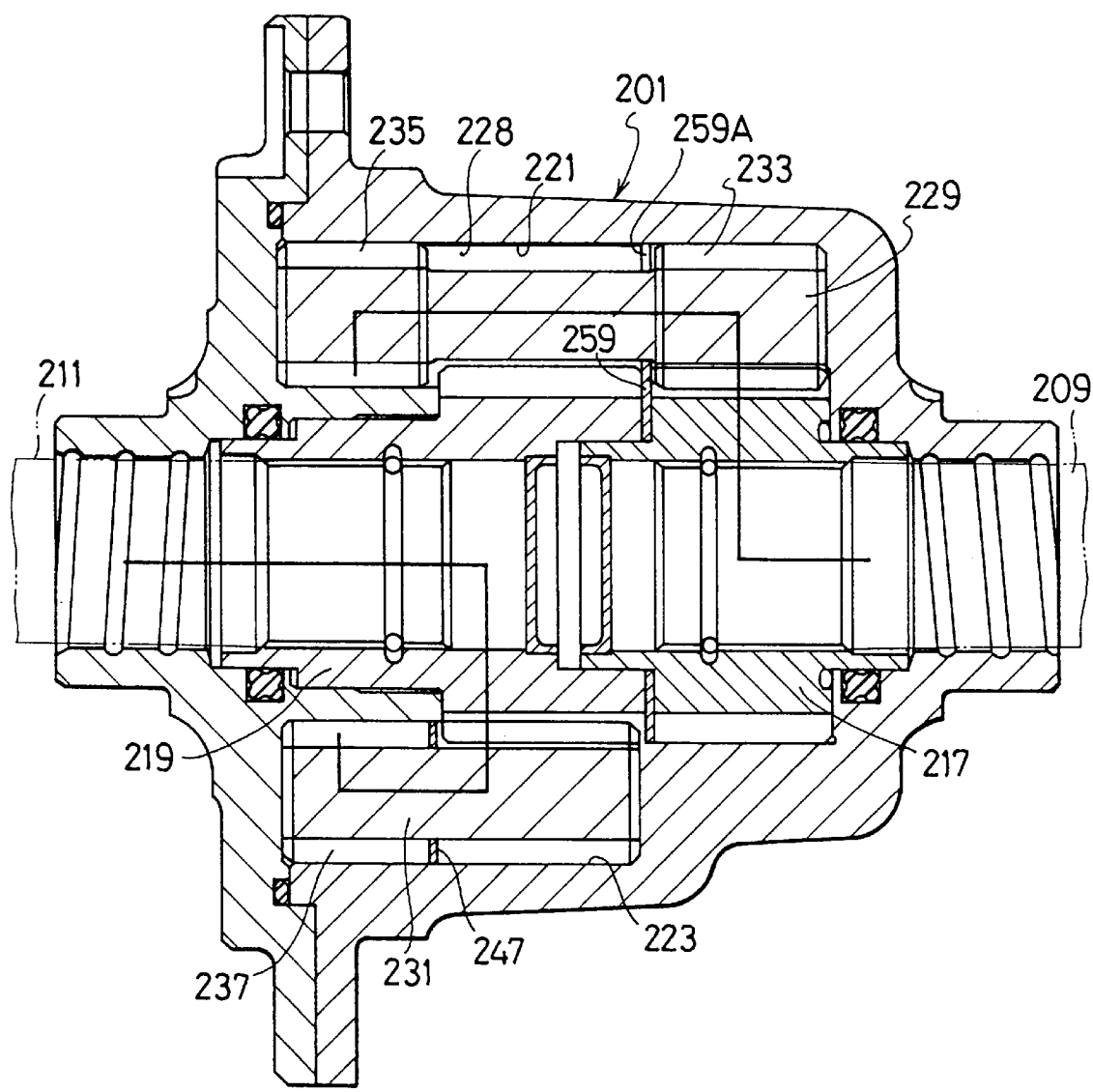
FIG. 10A is a cross-sectional view taken along the line 800A–800B shown in FIG. 9.

In more detail, FIG. 9 is a front side view showing the differential housing 201 of this third embodiment, in which four pairs of the first and second pinion housing holes 221 and 223 are formed being arranged at regular angular intervals around the first and second side gears. Further. FIG. 10A is a cross-sectional view taken along the line 800A–800B in FIG. 9 nd FIG. 10 is a cross-sectional view taken along the line 800A—800A In FIG. 9.

Figure 10B:
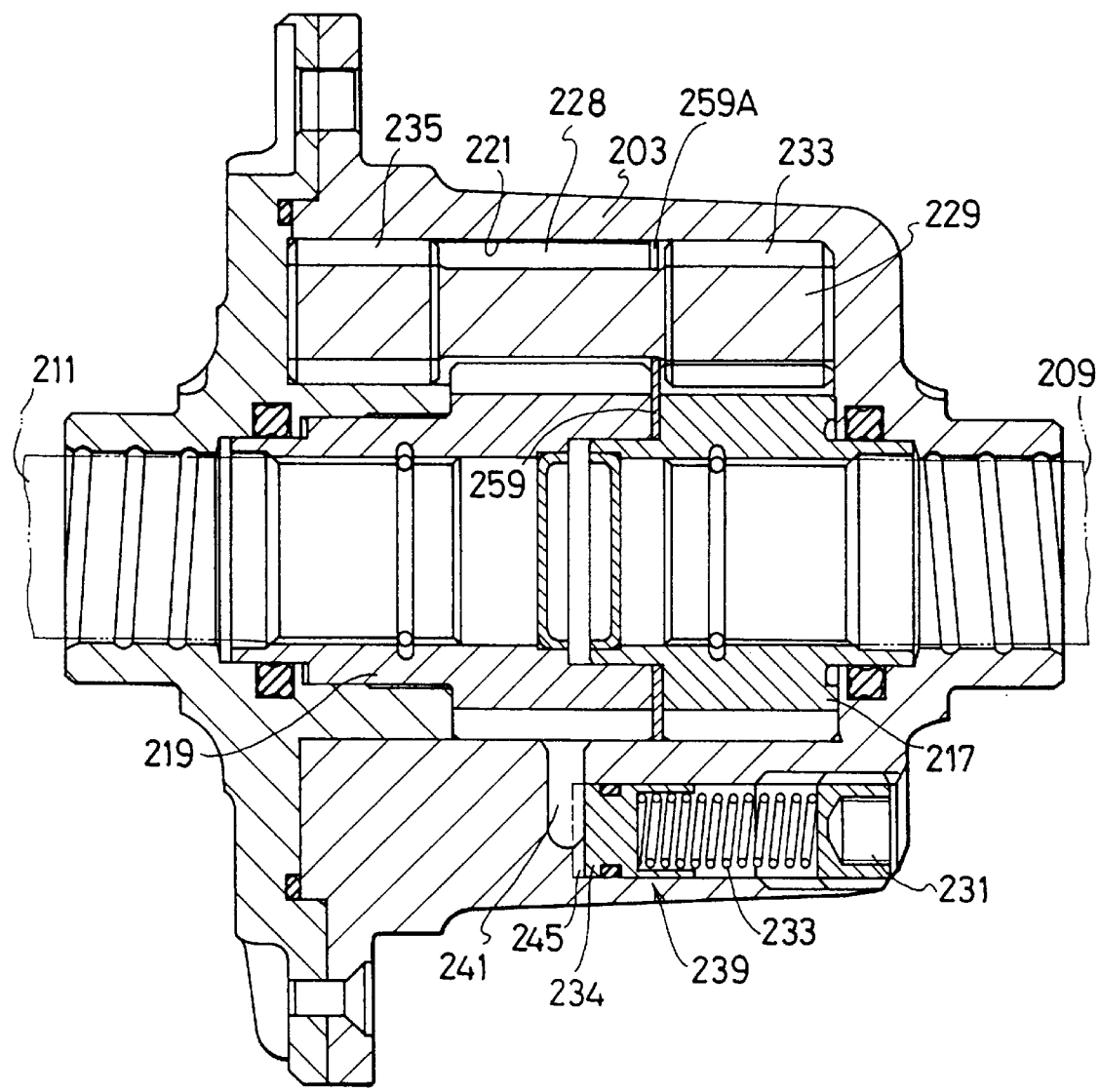
FIG. 10B is a cross-sectional view taken along the line 800A—800A shown in FIG. 9.

As shown in FIG. 10B, an accumulator 239 having an accumulator chamber 245 is formed in the differential casing body 203 and between two adjacent first pinion housing holes 221 in such a way as to open to a communication portion 241 (see FIGS. 9, 10B and 11A) formed between two adjacent middle opening portions 228 (see FIG. 10A) of the first pinion gear 229. Therefore, when the oil pressure rises due to the helical gear pumping action of the two side gears 217 and 219 and the first and second Pinion gears 229 and 231. since the oil flowing into the accumulator chamber 246 can be fairly restricted through the communication portions 241, it is possible to prevent the differential limiting force generated by the helical gear pumping action from being directly dropped by the accumulator chamber 245 abruptly. In addition, since the accumulator 239 is formed near the outer circumferential surface of the casing 203, oil (viscous fluid) can be easily put into the accumulator 239 through an accumulator hole (not shown) formed in the casing body 203, so that it is possible to simplify the apparatus manufacture and assembly.

In the case of the first and second embodiments, since the accumulator is provided between the first and second side gears, the pressure change caused on the surfaces or the two side gears are directly applied into the accumulator, with the result that the differential limiting force tends to be coarsely lowered.

In this third embodiment, however, since the accumulator chamber 245 communicates with the opening portions 228 (the small-diameter portions) of the first pinion gears 229 through the communication portions 241, the pressure change generated by the helical gear pumping action is not directly transmitted to the accumulator chamber 245, so that it is possible to utilize the differential limiting force more effectively and finely at high response speed.

Figure 12A:
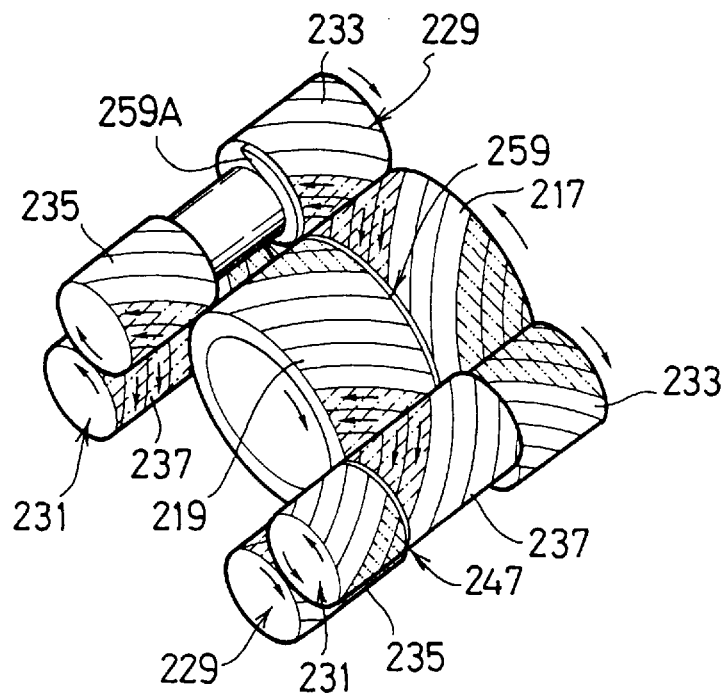
Figure 12B:
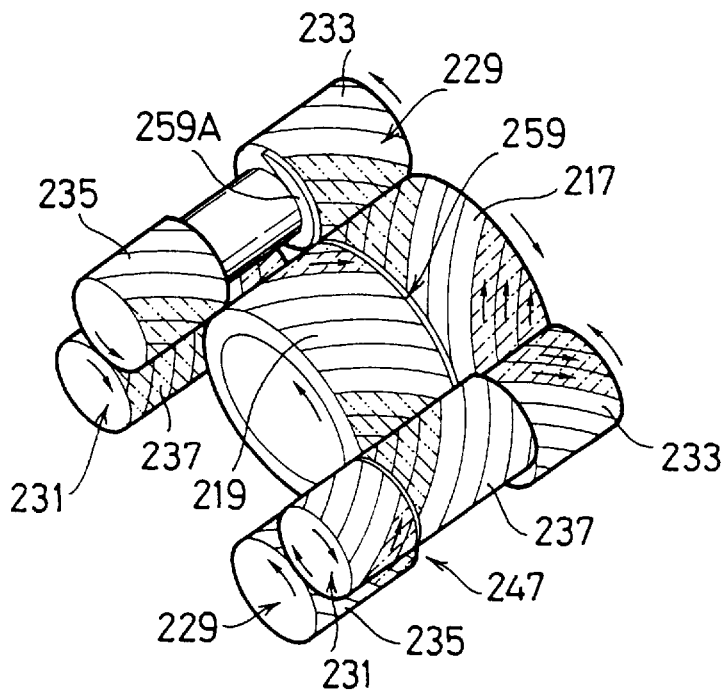

Further, as shown in FIGS. 12A and 12B, a split washer 247 is fitted and welded to A groove formed in the second pinion gear 231 at such a boundary position between a gear portion (the right side) in mesh with the second side gear 219 and a gear portion (the left side) in mesh with the gear portion 235 of the first pinion gear 229. This split washer can prevent the pressure generated at two different gear potions from interfering with each other, as described later in further detail.

Figure 11A:
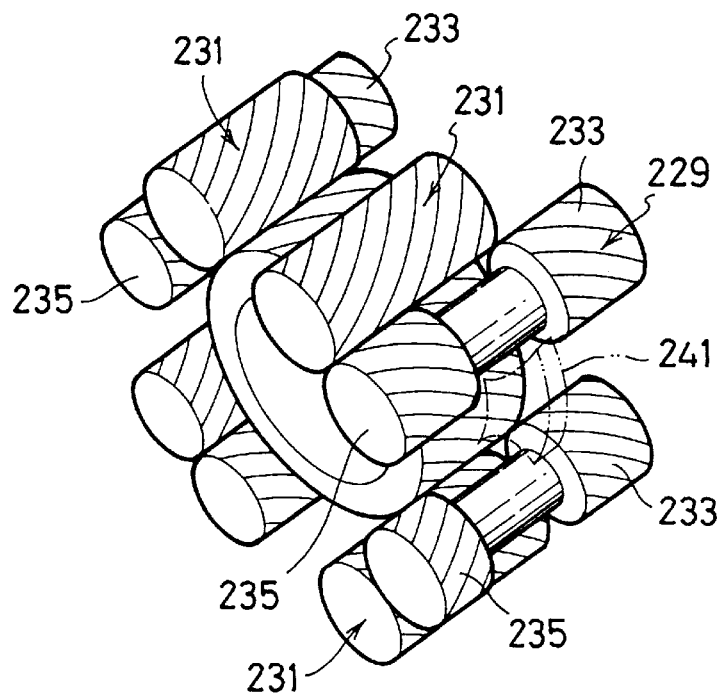
FIG. 11A is a perspective view showing the helical pinion gear assembly and the link portion of the third embodiment of the present invention.
Figure 11B:
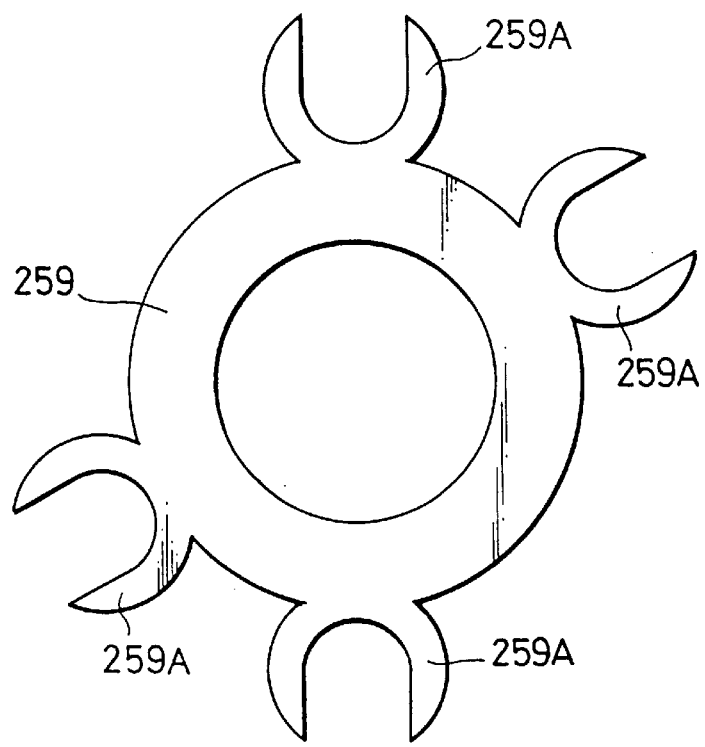
FIG. 11B is a plan view showing a thrust washer interposed between the two side gears of the third embodiment of the present invention.

Further, as shown in FIGS. 12A and 12B, thrust washer 250 as shown in FIG. 11B is interposed between the two side gears 217 and 2119. As shown in FIG. 11B, this thrust washer 259 is formed with four U-shaped projections 259A fitted to the four axial portions of the four first pinion gears 229, respectively. This U-shaped projection 259A serves to close the inner end surface of the first gear portion 233 of the first pinion gear 229 in mesh with the first side gear 217. This thrust washer 259 allows the pressure generated by the helical gear pumping action to be utilized more effectively, as described later in further detail.

Further, as shown in FIG. 10B, the accumulator 239 is composed of a piston 234, a coil spring 233 and an adjust screw 231. Therefore, after the viscous fluid (silicone oil) and an appropriate amount of air are sealed within the differential casing 201, when the adjust screw 231 is rotated, it is possible to change the fluid charge rate (the ratio of the amount of fluid to the total inner volume of the differential casing 201), so that the differential limiting characteristics of the helical gear pumping action can be finely adjustable. In this connection, when an excessive air is introduced into the casing 201, since the air volume is easily contracted under pressure, it is impossible to raise the oil pressure effectively, that is, to obtain an sufficient differential limiting force.

Further, in this third embodiment, there exists no specific path communicating between the helical gear surfaces (at which pressure is generated) and the accumulator 239. However, the oil can circulate within the differential casing 201 through gaps formed between the tooth ends of the pinion gears and the inner wall surfaces of the pinion housing holes formed in the casing body 203.

The functions of the split washer 247 and the thrust washer 259 will be explained with reference to FIGS. 12A and 12B, in which FIG. 12A shows positive pressure regions hatched by dot-dashed lines and negative (vacuum) pressure regions hatched by dot-dot-dashed lines obtained when the vehicle is turned to the left side; and FIG. 12B shows similar positive pressure regions and negative (vacuum) pressure regions obtained when the vehicle is turned to the right side.

When the first and second side gears 217 and 219 and the first and second pinion gears 229 and 231 rotate, the positive or negative pressure of the viscous fluid distributes as shown. In more detail, as shown in FIGS. 12A and 12B, the oil pressure rises to a positive value at the regions in which two opposing helical gear teeth will be engaged with each other (the dot-dashed hatch portions) but the falls to a negative value (vacuum) at the regions in which two opposing helical gear teeth has been disengaged from each other (the dot-dot-dashed hatch portions). Therefore, these pressure change acts as a differential limiting force, so that an engine power can be transmitted to the wheel of less resistance between the tire and the road surface.

However, when the thrust washer 259 and the split washer 247 are absent, the positive and negative pressures generated by the helical gear pumping action are interfered with each other, that is, the generated pressure is relieved from the positive pressure side to the negative pressure side or vice versa. In contrast with this, when these washers 259 and 241 are present, since the generated pressure can be utilized more independently or separately, it is possible to generate and utilize the differential limiting force more effectively and finely. Therefore, in the third embodiment of the differential apparatus, according to the present invention can responds to the differential motion at high speed and more finely, thus improving both the rotation difference sensitive and the torque sensitive characteristics.

As described above, in the above mentioned first to third embodiment or the differential apparatus according to the present invention, since a viscous fluid is sealed within the differential casing, when a differential motion occurs between the two side gears, the viscous fluid is pressurized and circulated within the differential calling due to the pumping action of the helical-pinion gear assembly. As a result, the reaction force of the pressurized viscous fluid is applied to the pinion gear assembly, so that a differential limiting force can be generated as with the case where the vehicle is being slipped. That is, the helical pinion gears rotate under such conditions that tooth surfaces thereof are brought into pressure contact with each other and further the outer surfaces thereof are brought into pressure contact with the inner surface of the differential casing. Accordingly, an reaction force thereof is transmitted to the side gear linked with the other (non-floating) or the vehicle wheel, so that it is possible to drive the vehicle.

Further, in the differential apparatus according to the present invention, the differential limiting characteristics of both the torque sensitive type and the rotation difference type can be obtained. Further, since only a viscous fluid is sealed within differential casing so that the differential limiting force can be generated by the helical gear pumping action, the differential apparatus according to the present invention is particularly simple in structure and low in manufacturing cost.

Fourth embodiment

The concept of the present invention such that a differential limiting force can be generated on the basis of pumping action of a helical gear assembly when the apparatus is driven by a differential motion within a casing filled with a viscous fluid can be applied to other power transmission apparatus. This embodiment is an example when the above-mentioned concept is applied to a differential torque transmission apparatus.

Figure 13A:
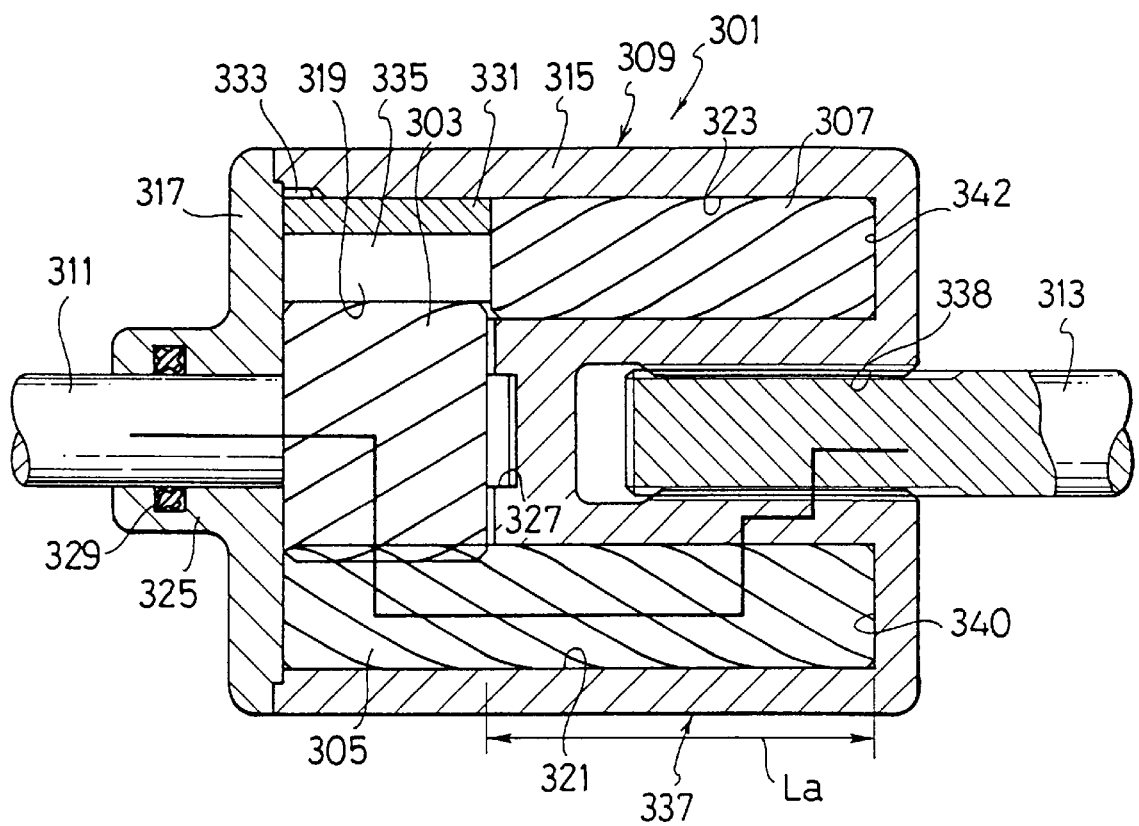
FIG. 13A is a cross-sectional view showing a fourth embodiment of the differential apparatus according to the present invention.
Figure 13B:
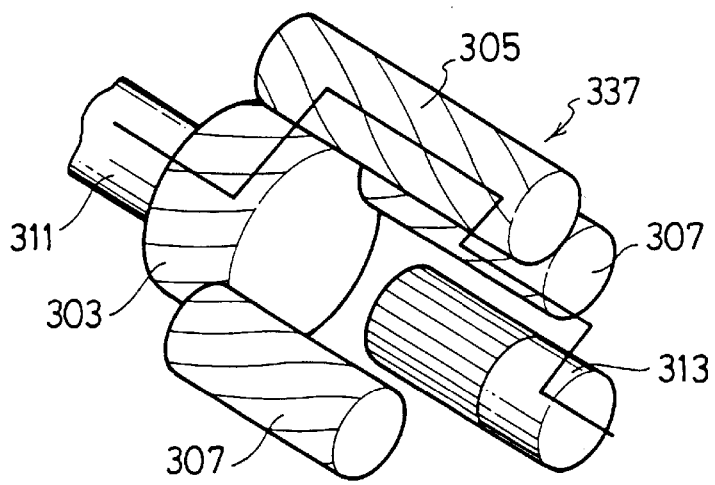
FIG. 13B is a perspective view showing a helical gear assembly of the fourth embodiment of the present invention.

This embodiment of the present invention will be described hereinbelow with reference to FIGS. 13A and 13B. The differential apparatus 301 of planetary gear type torque transmission apparatus is roughly composed of a casing 309, an input shaft 311, an output shaft 313, a sun gear 303, and a plurality of pairs of first and second pinion gears 305 and 307 acting a screw pump 337.

The output shaft 313 is spline coupled to the casing 309 at a spline portion 333 formed in the casing 309. Therefore, the output shaft 313 rotates together with the casing 309.

The casing 309 is composed of a casing body 313 and a cover 317 fixed to the one outer edge portion of the casing body 315 by welding, for instance. The casing 309 is formed with a sun rear housing hole 319 for holding the sun gear 303, and a plurality (e.g. four) of pairs of pinion housing holes 321 and 323 for housing the first and second pinion gears 305 and 307, respectively arranged at regular angular intervals (e.g. 90 degrees) along the circumferential direction around the sun gear housing hole 319. The rotational axis of the sun gear housing hole 319 is the same as the axial direction of the casing 309. The rotational axes of the pinion housing holes 321 and 323 are arranged in parallel to the rotational axis of the casing 309. The pinion housing hole 321 is partially overlapped with the sun gear housing hole 319 along the axial direction. Further, the sun gear housing hole 319 and two pairs of the pinion housing holes 321 and 323 are all formed airtightly, and filled with an appropriate fluid (e.g., silicone oil).

The sun gear 303 is rotatably supported within the sun gear housing hole 319 coaxially with the rotational axis or the casing 309, and further linked to the input shaft 311. The input shaft 311 is rotatably supported by a boss portion 325 or the cover 317 and an inner recessed portion 327 of the casing body 315. The sun gear 303 is fixed to the input shaft 311 so as to be rotated together. A sealing member 329 is interposed between the boss portion 325 and the input shaft 311.

The first pinion gear 305 is rotatably supported by the pinion housing hole 321 in such a way that both the ends thereof are positioned by the right and left side walls of the casing body 309. The second pinion gear 307 is rotatably supported by the pinion housing hole 323 in such a way that the right end thereof is positioned by the right side wall of the casing body 309 and the left end thereof is positioned by a locating member 331 attached to the pinion housing hole 323. The axial length of this locating member 303 is roughly equal to the gear width of the sun gear 303. The locating member 303 is fixed to the casing body 315 by an engage portion 333 thereof. Therefore, a working chamber 335 can be formed within the pinion housing hole 323.

The first pinion gear 305 is in mesh with the sun gear 303 at the overlapped portion between the pinion housing hole 321 and the sun gear housing hole 319. Further, the first pinion gear 305 is in mesh with the second pinion gear 307 at the overlapped portion between the pinion housing holes 321 and 323.

A screw pump 337 can be formed at a region La at which the first and second pinion gears 305 and 307 are in mesh with each other.

These sun gear 303 and the first and second pinion gears 305 and 307 are all helical gears. The module, pressure angle, and torsional angle of these helical gears are all equal to each other.

The fitting degree between the first and second pinion gears 305 and 307 and the pinion housing holes 321 and 323 is relatively tight in order to generate sufficient frictional torque between the two. The material of these fitting portion is preferably a material high in wear resistance, for instance such as steel whose surface is hardened.

Further, it is also possible to increase the frictional torque by increasing the surface roughness of the outer circumferential surfaces of the teeth of the first and second pinion gears 305 and 307 and the inner circumferential surface of the pinion housing holes 321 and 323, respectively.

The casing body 315 is arranged coaxially with the rotational axis of the casing 309, and formed with a blind spline hole 339 on the left side wall of the casing 309, into which the output shaft 313 is spline coupled.

The operation of this fourth embodiment will be described hereinbelow.

When the input shaft 311 is rotated, a rotational force is transmitted from the sun gear 303 to the casing 309, that is, to the output shaft 313 through the first and second pinion gears 303 and 307.

Under these conditions, when the input shaft 311 and the output shaft 313 rotate at the same rotational speed, that is, there exists no differential rotation between the input and output shafts 311 and 313, the sun gear 303 rotates together with the casing 309, so that no torque is transmitted from the input shaft 311 to the output shaft 313 or vice versa.

When a differential rotation is generated between the input and output shafts 311 and 313, for instance, as when the sun gear 303 rotates faster than the casing 309 (i.e. the output shaft 313), the first pinion gear 305 (in mesh with the sun gear 303) and the second pinion gear 307 (in mesh with the first pinion gear 305) rotate around the axis of the casing 309 in the same rotational direction. In this case, however, since the rotational speed of the pinion housing holes 321 and 323 of the casing 309 in the same direction (around the sun gear 303) is slower than that (around the sun gear 303) of the first and second pinion gears 305 and 307, the first pinion gear 305 rotates within the pinion housing hole 321 in frictional contact with the inner wall surface thereof. In this case, since the tooth surfaces of the first pinion gear 305 are brought into pressure contact with those of the second pinion gear 307, the second pinion gear 307 also rotates within the pinion housing hole 323 in frictional contact with the inner wall surface thereof.

Under these rotational conditions, since the working oil in the working chamber 335 of the second pinion housing hole 323 is compressed by the helical gear pump 337 formed at the region La in which the first pinion gear 305 and the second pinion gear 307 are rotating in mesh with each other, the second pinion gear 307 is urged in the axial direction by the hydraulic reaction force, so that the first pinion gear 305 rotates being brought into pressure contact with he sun gear 303. Further, due to the gearing reaction force against the sun gear 303, the first pinion gear 305 is brought into pressure contact with the inner circumferential surface and the side end surface 340 of the first pinion housing hole 321. In the same way, the second pinion gear 307 is brought into pressure contact with the inner circumferential surface and the side end surface 342 of the second pinion housing hole 323, with the result that the frictional torque of the first and second pinion gears 305 and 307 increases. In this embodiment, since a plurality of the screw pumps can be driven by a single sun gear 303, it is possible to increase the helical gear pumping action obtained when the input and output shafts are rotated differentially.

Therefore, the rotational of the sun gear 303 is limited by this helical gear pumping action, so that the casing 309 can be rotated as its reaction force. In other words, since the transmitted torque can be controlled according to the rotational speed difference between the input and output shafts 311 and 313, it is possible to control the torque transmission characteristics according to the differential motion between the two shafts. Further, since the reaction forces generated by the sun gear 303 and the pinion gears 305 and 307 change according to the magnitude of torque inputted to the input shaft 311, that is, since the thrust forces and the radial pressure applied against the housing holes of the respective gears change according to the magnitude of the torque inputted to the input shaft 311, it is possible to control the rotational speed of the apparatus according to the input torque, that is, to realize a torque-sensitive differential torque transmission apparatus.

Fifth Embodiment

Figure 14A:
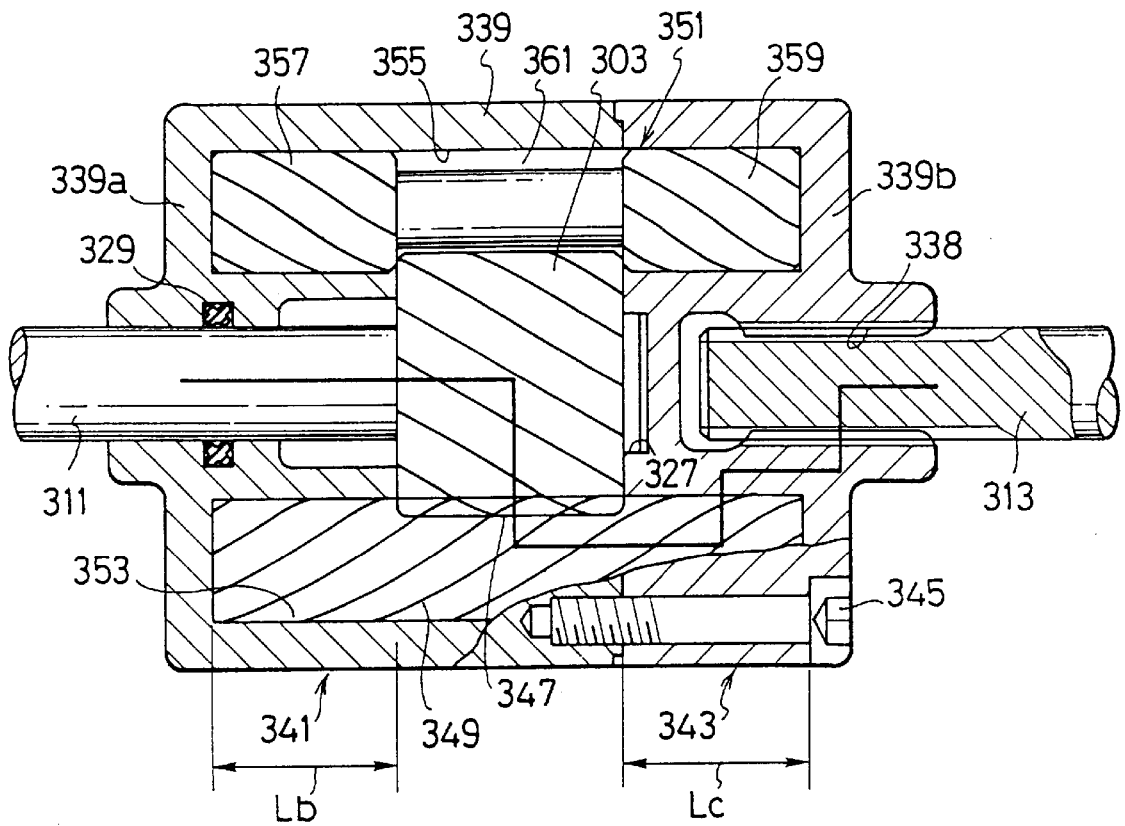
FIG. 14A is a cross-sectional view showing a fifth embodiment of the differential apparatus according to the present invention.
Figure 14B:
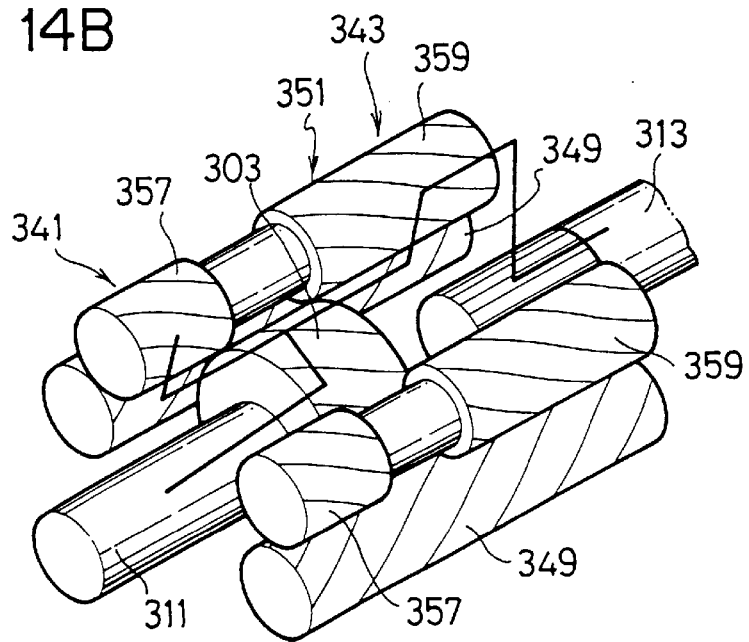
FIG. 14B is a perspective view showing a helical gear assembly of the fifth embodiment of the present invention.

A fifth embodiment of the present invention will be described hereinbelow with reference to FIGS. 14A and 14B. In this differential torque transmission apparatus, a sun gear 303 is disposed at roughly the axially middle portion of the casing 339, and a pair of screw pumps 341 and 343 are arranged on both sides of the sun gear 303.

In more detail, a casing 339 is composed of an input shaft side casing 339a and an output shaft side casing 339b, and both casings are fastened to each other with bolts 345.

The casing 399 is formed with a sun gear housing hole 347, and two pairs of first and second pinion housing holes 353 and 355. The sun gear housing hole 347 is formed at roughly the axially middle portion thereof, and the first and second pinion housing holes 353 and 355 are formed radially outward along the sun gear housing hole 347. The first pinion housing hole 353 is formed so as to overlap with both the sun gear housing hole 347 and the second pinion housing hole 555 partially in the axial direction of the casing 339.

A first pinion gear 349 is rotatably fitted to the first pinion housing hole 353 and in mesh with the sun gear 303 rotatably housed in the sun gear housing hole 347 at the middle portion of the first pinion gear 349.

A second pinion gear 351 having a first gear portion 357 and a second gear portion 359 is rotatably fitted to the second pinion housing hole 355. The first and second gear portions 557 and 559 are both in mesh with the first pinion gear 349 on both sides thereof.

A first screw pump 341 can be formed at the region Lb in which the first gear portion 357 of the second pinion gear 301 and the first pinion gear 349 are in mesh with each other, and a second screw pump 343 can be formed at the region Lc in which the second gear portion 359 of the second pinion gear 351 and the first pinion gear 349 are in mesh with each other. Further, a working fluid chamber 361 is formed within the second pinion housing hole 355 and between the first and second gear portions 357 and 359 of the second pinion gear 351. The width of the working fluid chamber 344 is slightly larger than the tooth width of the sun tear 303.

The operation of this embodiment will be described hereinbelow. When the input shaft 311 and the output shaft 313 rotate differentially in a first (forward) rotational direction, the working oil in the working fluid chamber 361 within the second pinion housing hole 355 is compressed by the action of the screw pump 341, so that the first gear portion 357 of the second pinion gear 351 is urged in the axial direction by the hydraulic reaction force. As a result, the first pinion gear 349 and the sun gear 303 are rotated under the conditions that the tooth surfaces of both are brought into pressure contact with each other, and in addition the first pinion gear 349 is brought into pressure contact with the inner circumferential surface of the first pinion housing hole 353 due to the reaction force generated by the gearing with the sun gear 303. In accompany with this, the first and second gear portions 357 and 359 of the second pinion gear 351 are brought into pressure contact with the inner circumferential surface of the second pinion housing hole 355, so that the friction force increases.

On the other hand, when the input shaft 311 and the output shaft 311 rotate differentially in a second (reverse) rotational direction, the working oil in the working fluid chamber 361 within the second pinion housing hole 355 is compressed by the action of the screw pump 343, so that the second gear portion 359 of the second pinion gear 351 is urged in the axial direction by the hydraulic reaction force. As a result, the first pinion gear 349 and the sun gear 303 are rotated under the conditions that the tooth surfaces of both are brought into pressure contact with each other, and in addition the first pinion gear 349 is brought into pressure contact with the inner circumferential surface of the first pinion housing hole 353 due to the reaction force generated by the gearing with the sun gear 303. In accompany with this, the first and second gear portions 357 and 359 of the second pinion gear 351 are brought into pressure contact with the inner circumferential surface of the second pinion housing hole 355, so that the friction force increases.

Therefore. when the differential motion occurs in any of the rotational direction, it is possible to improve the torque transmission characteristics.

Further, in this fifth embodiment, when the lengths Lb and Lc of the screw pumping regions 341 and 343 are adjusted, it is possible to adjust the torque transmission characteristics according to the rotational direction of the input and output shafts 311 and 313.

Further, in the same way as the fourth embodiment, since the sun gear 303 can rotate a plurality of pairs of the first and second pinion gears 349 and 351, when the number of pairs of the first and second pinion gears of increased, it is possible to adjustably increase the pumping action.

Further, since the rotational speed of the apparatus can be controlled according to the input torque, it is possible to realize a torque-sensitive differential torque transmission apparatus.

As described above, in the differential torque transmission apparatus according to the present invention, it is possible to control the torque transmissible between the two shafts according to the rotational speed difference between two shafts, in spite of the simple structure.

What is claimed is:

1. A differential apparatus, comprising:
    a differential casing rotatable by an external power;
    a first shaft rotatably supported by said differential casing;
    a second shaft rotatably supported by said differential casing;
    a first side gear formed integrally and rotatable with said first shaft within said differential casing;
    a second side gear formed integrally and rotatable with said second shaft within said differential casing;
    a body of viscous fluid filling said differential casing;
    a helical pinion gear assembly having a first pinion pair of a first helical pinion gear and a second helical pinion gear rotatably fitted in a first pinion housing hole and a second pinion housing hole, respectively both said first and second pinion housing holes formed in said differential casing, said helical pinion gear assembly being geared between said first and second side gears within said differential casing for generating a differential limiting force by gearing between said helical pinion gear assembly and said first and second side gears, as the viscous fluid is pressured and circulated within said differential casing by a gear pumping action of said helical pinion gear assembly caused by a differential motion between said first and second side gears, said first helical pinion gear being formed with a first gear portion in mesh with said first side gear, a second gear portion, and an intermediate opening portion formed between the first and second gear portions, said second helical pinion gear being formed with a third gear portion in mesh with the second gear portion of said first helical pinion gear and said second side gear; and
    a splitting washer fixed to a groove formed in said second helical pinion gear, at a boundary between a part of the third gear portion thereof in mesh with said second side gear and another part of the third gear portion in mesh with the second gear portion of said first helical pinion gear.

2. The differential apparatus of claim 1, which further comprises an accumulator provided with a pressure relief valve formed within said differential casing to hold the viscous fluid roughly at a constant pressure.

3. The differential apparatus of claim 2, wherein said accumulator is disposed between inner ends of said first and second shafts within said casing.

4. The differential apparatus of claim 2, wherein said helical pinion gear assembly has a second pinion pair also including a first helical pinion gear and a second helical pinion gear, and the accumulator is disposed between said pinion pairs of the first and second helical pinion gears for communication with a spacing around a reduced-diameter part of the intermediate opening portion of each said first helical pinion gear of said helical pinion gear assembly via a communication portion.

5. The differential apparatus of claim 4, wherein the accumulator has a fluid pressure adjusting means for adjusting a fluid charge rate to a volume of said differential casing.

6. The differential apparatus of claim 5, wherein said fluid pressure adjusting means comprises:
   a piston fitted in an accumulator chamber communicating with the accumulator;
   an adjust screw having an adjustable position relative to the accumulator chamber; and
   a coil spring interposed between said piston and said adjust screw.

7. The differential apparatus of claim 2, wherein said helical pinion gear assembly has a second pinion pair also including a first helical pinion gear and a second helical pinion gear and rotatably fitted in another first pinion housing hole and another second pinion housing hole, respectively, and the accumulator is provided between said first pinion housing holes of said first and second pinion pairs.

8. The differential apparatus of claim 1, wherein the differential limiting force is generated between said first and second side gears, with increased frictional forces between a circumference of said helical pinion gear assembly and a wall of said differential casing, between intra-meshing surfaces of said helical pinion gear assembly and between mutually meshing surfaces between said helical pinion gear assembly and said first and second side gears respectively.

9. The differential apparatus of claim 1, wherein said second helical pinion gear is formed with a fourth gear portion in mesh with the first gear portion of said first helical pinion gear.

10. A differential apparatus, comprising:
    a differential casing rotatable by an external power;
    a first shaft rotatably supported by said differential casing;
    a second shaft rotatably supported by said differential casing;
    a first side gear rotatable integrally with said first shaft within said differential casing;
    a second side gear rotatable integrally with said second shaft within said differential casing;
    a body of viscous fluid filling said differential casing;
    a helical pinion gear assembly having a pinion pair of a first helical pinion gear and a second helical pinion gear rotatably fitted either to both of a first pinion housing hole and a second pinion housing hole both formed in said differential casing, said helical pinion gear assembly being geared between said first and second side gears within said differential casing, for generating a differential limiting force by gearing between said helical pinion gear assembly and said first and second side gears, as the viscous fluid is pressured and circulated within said differential casing by a gear pumping action of said helical pinion gear assembly caused by differential motion between said first and second side gears, said first helical pinion gear being formed with a first gear portion in mesh with said first side gear, a second gear portion, and an intermediate opening portion formed between the first and second gear portions, said second helical pinion gear being formed with a third gear portion in mesh with the second gear portion of said first helical pinion gear and said second side gear; and
    a thrust washer interposed between said first and second side gears, the thrust washer having a U-shaped projection for closing an inner end of the first gear portion of said first pinion gear to substantially prevent the viscous fluid from leaking therefrom. as the viscous fluid is pressurized.

11. The differential apparatus of claim 10, wherein said second helical pinion gear is formed with a fourth gear portion in mesh with the first gear portion of said first helical pinion gear.

12. A differential apparatus, comprising:
    a differential casing rotatable by an external power;
    a first shaft rotatably supported by said differential casing;
    a second shaft rotatably supported by said differential casing;
    a first side gear formed integrally and rotatable with said first shaft within said differential casing;
    a second side gear formed integrally and rotatable with said second shaft within said differential casing;
    a body of viscous fluid filling said differential casing;
    a helical pinion gear assembly intergearinq between said first and second side gears within said differential casing for generating a differential limiting force to limit a differential motion said first and second side gears make relative to each other, as the viscous fluid is pressurized and circulated within said differential casing by a gear pumping action of said helical pinion gear assembly caused by said differential motion, said helical pinion gear assembly comprising a first pinion pair and a second pinion pair, each pinion pair including a first helical pinion gear and a second helical pinion gear, each of said first helical pinion gears meshing with said first side gear and being slidably fitted in a casing wall of said differential casing, each of said first helical pinion gears having a reduced-diameter portion cooperative with said casing wall to define an open portion, and each of said second helical pinion gears meshing with said first helical pinion gear and said second side gear; and
    an accumulator provided with a pressure relief valve in said differential casing for holding the viscous fluid substantially at a constant pressure, the accumulator communicating with respective said opening portions of said first and second pinion pairs, the accumulator being disposed between said first and second pinion pairs and arranged in said casing wall.

13. The differential apparatus of claim 12, further comprising a fluid pressure adjusting means disposed in said accumulator for adjusting a fluid charge rate to a volume of said differential casing.

14. The differential apparatus of claim 13, wherein the accumulator comprises an accumulator chamber formed in the casing wall, and
    wherein said fluid pressure adjusting means comprises:
       a piston fitted in the accumulator chamber;
       an adjust screw operable from outside of the casing wall to adjust a relative position thereof to the accumulator chamber; and
       a coil spring interposed between said piston and said adjust screw.

15. The differential apparatus of claim 12, wherein the differential limiting force is generated between said first and second side gears with friction forces developed between a circumference of said helical pinion gear assembly and said differential casing wall, between intrameshing surfaces of said helical pinion gear assembly, and between mutually meshing surfaces between said helical pinion gear assembly and said first and second side gears.

* * * * *